United States Patent
Kim et al.

(10) Patent No.: US 9,485,110 B2
(45) Date of Patent: Nov. 1, 2016

(54) APPARATUS FOR ALERTING AN EMERGENCY VIA BROADCAST SIGNAL TRANSMISSION/RECEPTION AND METHOD FOR ALERTING AN EMERGENCY VIA BROADCAST SIGNAL TRANSMISSION/RECEPTION

(71) Applicant: LG Electronics Inc., Seoul (KR)

(72) Inventors: Woochan Kim, Seoul (KR); Sungryong Hong, Seoul (KR); Woosuk Ko, Seoul (KR); Jaeho Hwang, Seoul (KR); Byounggill Kim, Seoul (KR); Jaehyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/330,740

(22) Filed: Jul. 14, 2014

(65) Prior Publication Data
US 2015/0016453 A1    Jan. 15, 2015

Related U.S. Application Data

(60) Provisional application No. 61/846,086, filed on Jul. 15, 2013, provisional application No. 61/856,759, filed on Jul. 21, 2013.

(51) Int. Cl.
*H04L 12/18* (2006.01)
*H04W 4/22* (2009.01)
*H04L 27/26* (2006.01)

(52) U.S. Cl.
CPC ......... *H04L 12/1895* (2013.01); *H04L 27/261* (2013.01); *H04W 4/22* (2013.01)

(58) Field of Classification Search
None
See application file for complete search history.

(56) References Cited

U.S. PATENT DOCUMENTS

| | | | |
|---|---|---|---|
| 8,458,752 B2 | 6/2013 | Yun et al. | |
| 8,644,406 B2 * | 2/2014 | Ko | H04L 27/04 375/260 |
| 2009/0103649 A1 * | 4/2009 | Vare | H04L 5/0064 375/295 |
| 2010/0105351 A1 * | 4/2010 | Xu | H04W 68/00 455/404.1 |
| 2010/0110956 A1 * | 5/2010 | Hepworth | H04W 4/22 370/312 |
| 2011/0131464 A1 * | 6/2011 | Ko | H04L 1/0041 714/752 |

FOREIGN PATENT DOCUMENTS

| | | |
|---|---|---|
| EP | 2557717 A1 | 2/2013 |
| WO | 2010079997 A2 | 7/2010 |
| WO | 2011099739 A2 | 8/2011 |

\* cited by examiner

*Primary Examiner* — Brian Roberts
(74) *Attorney, Agent, or Firm* — Dentons US LLP

(57) ABSTRACT

A method and an apparatus for transmitting broadcast signals thereof are disclosed. The method for transmitting broadcast signals includes encoding PLP data; building at least one signal frame by mapping the encoded PLP data; and modulating data in the built signal frame by OFDM method and transmitting a broadcast signal having the modulated data, wherein the signal frame includes a preamble having a preamble symbol and a guard interval, wherein the guard interval is generated by using a sequence and the preamble symbol.

12 Claims, 31 Drawing Sheets

APPARATUS FOR ALERTING AN EMERGENCY VIA BROADCAST SIGNAL TRANSMISSION/RECEPTION AND METHOD FOR ALERTING AN EMERGENCY VIA BROADCAST SIGNAL TRANSMISSION/RECEPTION

This application claims the benefit of U.S. Provisional Application Nos. 61/846,086 filed on Jul. 15, 2013 and 61/856,759 filed on Jul. 21, 2013, which is hereby incorporated by reference as if fully set forth herein.

BACKGROUND OF THE INVENTION

1. Field of the Invention

The present invention relates to an apparatus for transmitting broadcast signals, an apparatus for receiving broadcast signals and methods for transmitting and receiving broadcast signals.

2. Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention devised to solve the problem lies on an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention devised to solve the problem lies on an apparatus for transmitting broadcast signals, an apparatus for receiving broadcast signals and methods for transmitting and receiving broadcast signals to classify data corresponding to services by components, transmit data corresponding to each component as a data pipe, receive and process the data Another object of the present invention devised to solve the problem lies on an apparatus for transmitting broadcast signals, an apparatus for receiving broadcast signals and methods for transmitting and receiving broadcast signals to signal signaling information necessary to provide broadcast signals.

The object of the present invention can be achieved by providing a method of alerting an emergency via broadcast signal transmission including encoding PLP (Physical Layer Pipe) data; building at least one signal frame by mapping the encoded PLP data; and modulating data in the built signal frame by OFDM (Orthogonal Frequency Division Multiplexing) method and transmitting a broadcast signal having the modulated data, wherein the signal frame includes a preamble having a preamble symbol and a guard interval, wherein the guard interval is generated by using a sequence and the preamble symbol.

Preferably, the sequence is either a normal sequence or an EAS (Emergency Alert System) sequence, wherein information about the emergency is included in EAS data, wherein the EAS sequence provides signaling about the emergency.

Preferably, the preamble having the guard interval generated by using the EAS sequence notifies that at least one of signal frames transmitted with the corresponding signal frame includes the EAS data.

Preferably, the preamble having the guard interval generated by using the EAS sequence indicates that the corresponding signal frame includes the EAS data.

Preferably, the encoding PLP data further includes LDPC (Low Density Parity Check) encoding the PLP data, bit interleaving the LDPC encoded PLP data, mapping the bit interleaved PLP data onto constellations, MIMO (Multi Input Multi Output) encoding the mapped PLP data, and time interleaving the MIMO encoded DP data.

In another aspect of the present invention, provided herein is an method of alerting an emergency via broadcast signal reception including receiving a broadcast signal having at least one signal frame, and demodulating data in the at least one signal frame by OFDM (Orthogonal Frequency Division Multiplexing) method; parsing the received signal frames by demapping PLP (Physical Layer Pipe) data; and decoding the PLP data, wherein the signal frame includes a preamble having a preamble symbol and a guard interval, wherein the guard interval is generated by using a sequence and the preamble symbol.

Preferably, the sequence is either a normal sequence or an EAS (Emergency Alert System) sequence, wherein information about the emergency is included in EAS data, wherein the EAS sequence provides signaling about the emergency.

Preferably, the method further includes detecting the EAS sequence in the preamble, checking whether the corresponding signal frame includes the EAS data by using the preamble, and checking preambles in signal frames received after the checked signal frame, to find a signal frame including the EAS data.

Preferably, the method further includes detecting the EAS sequence in the preamble, checking whether the corresponding signal frame includes the EAS data by using the preamble, and decoding the EAS data in the corresponding signal frame, if the corresponding signal frame includes the EAS data.

Preferably, the decoding the PLP data further includes time deinterleaving the PLP data, MIMO (Multi Input Multi Output) decoding the time deinterleaved PLP data, demapping the MIMO decoded PLP data from constellations, bit deinterleaving the demapped PLP data, and LDPC (Low Density Parity Check) decoding the bit deinterleaved PLP data.

In another aspect of the present invention, provided herein is an apparatus for alerting an emergency via broadcast signal transmission including an encoding module for encoding PLP (Physical Layer Pipe) data; a frame building module for building at least one signal frame by mapping the encoded PLP data; and an OFDM module for modulating data in the built signal frame by OFDM (Orthogonal Frequency Division Multiplexing) method and transmitting a broadcast signal having the modulated data, wherein the signal frame includes a preamble having a preamble symbol and a guard interval, wherein the guard interval is generated by using a sequence and the preamble symbol.

Preferably, the sequence is either a normal sequence or an EAS (Emergency Alert System) sequence, wherein information about the emergency is included in EAS data, wherein the EAS sequence provides signaling about the emergency.

Preferably, the preamble having the guard interval generated by using the EAS sequence notifies that at least one of signal frames transmitted with the corresponding signal frame includes the EAS data.

Preferably, the preamble having the guard interval generated by using the EAS sequence indicates that the corresponding signal frame includes the EAS data.

Preferably, the encoding module further includes a LDPC (Low Density Parity Check) encoding block for LDPC encoding the PLP data, a bit interleaving block for bit interleaving the LDPC encoded PLP data, a constellation mapping block for mapping the bit interleaved PLP data onto constellations, a MIMO (Multi Input Multi Output) encoding block for MIMO encoding the mapped PLP data, and a time interleaving block for time interleaving the MIMO encoded DP data.

In another aspect of the present invention, provided herein is an apparatus for alerting an emergency via broadcast signal reception including an OFDM module for receiving a broadcast signal having at least one signal frame, and demodulating data in the at least one signal frame by OFDM (Orthogonal Frequency Division Multiplexing) method; a frame parsing module for parsing the received signal frames by demapping PLP (Physical Layer Pipe) data; and a decoding module for decoding the PLP data, wherein the signal frame includes a preamble having a preamble symbol and a guard interval, wherein the guard interval is generated by using a sequence and the preamble symbol.

Preferably, the sequence is either a normal sequence or an EAS (Emergency Alert System) sequence, wherein information about the emergency is included in EAS data, wherein the EAS sequence provides signaling about the emergency.

Preferably, the apparatus further includes a detecting module for detecting the EAS sequence in the preamble, a first checking module for checking whether the corresponding signal frame includes the EAS data by using the preamble, and a second checking module for checking preambles in signal frames received after the checked signal frame, to find a signal frame including the EAS data.

Preferably, the apparatus further includes a detecting module for detecting the EAS sequence in the preamble, a first checking module for checking whether the corresponding signal frame includes the EAS data by using the preamble, and an EAS decoding module for decoding the EAS data in the corresponding signal frame, if the corresponding signal frame includes the EAS data.

Preferably, the decoding module further includes a time deinterleaving block for time deinterleaving the PLP data, a MIMO (Multi Input Multi Output) decoding block for MIMO decoding the time deinterleaved PLP data, a constellation demapping block for demapping the MIMO decoded PLP data from constellations, a bit deinterleaving block for bit deinterleaving the demapped PLP data, and an LDPC (Low Density Parity Check) decoding block for LDPC decoding the bit deinterleaved PLP data.

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
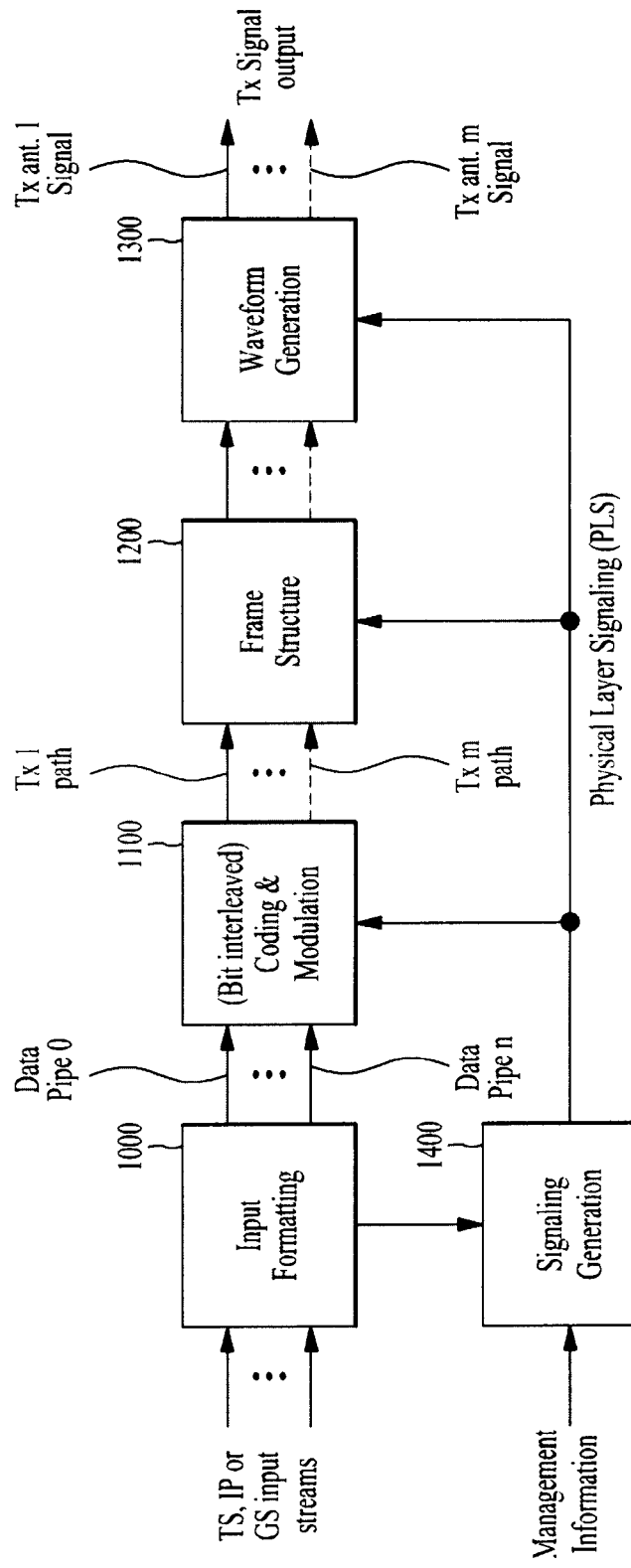
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
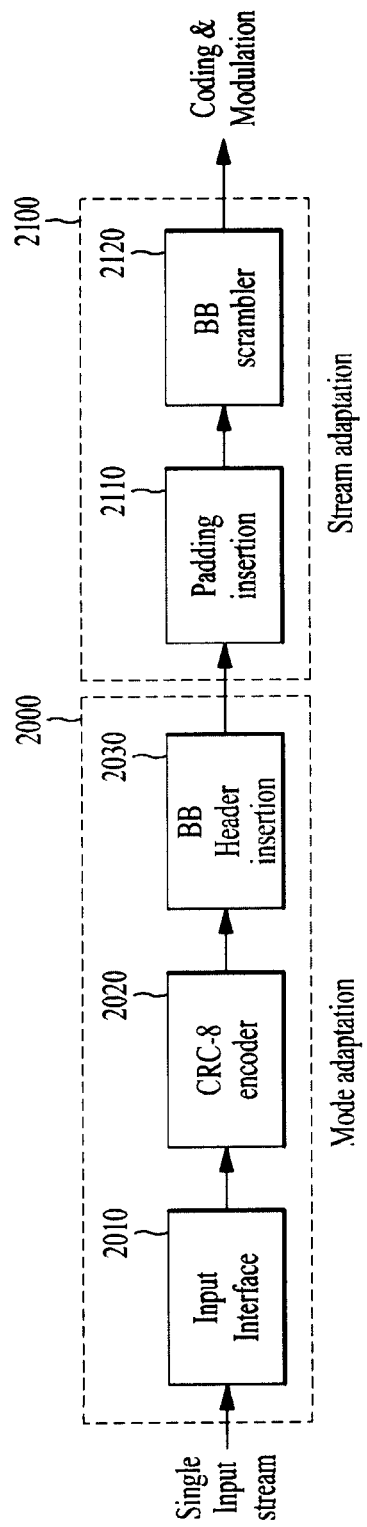
FIG. 2 illustrates an input formatting module according to an embodiment of the present invention.
Figure 3:
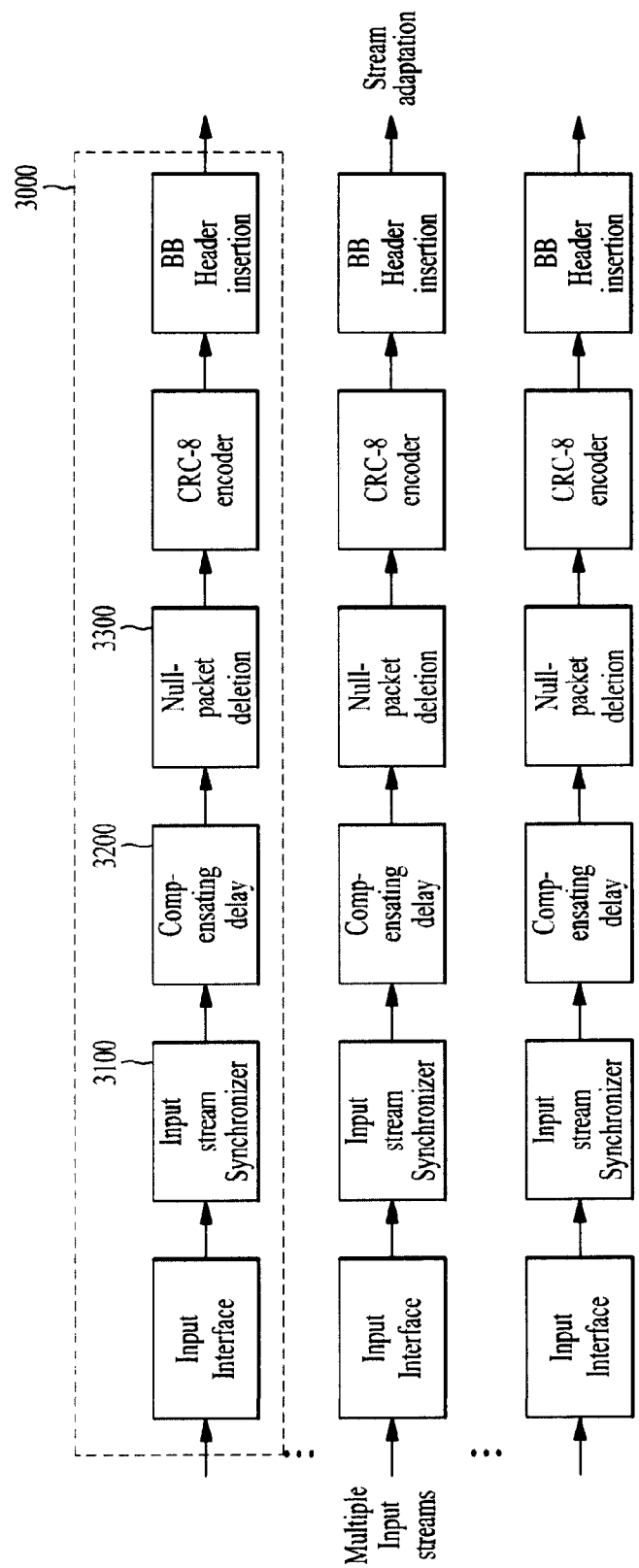
FIG. 3 illustrates an input formatting module according to another embodiment of the present invention.
Figure 4:
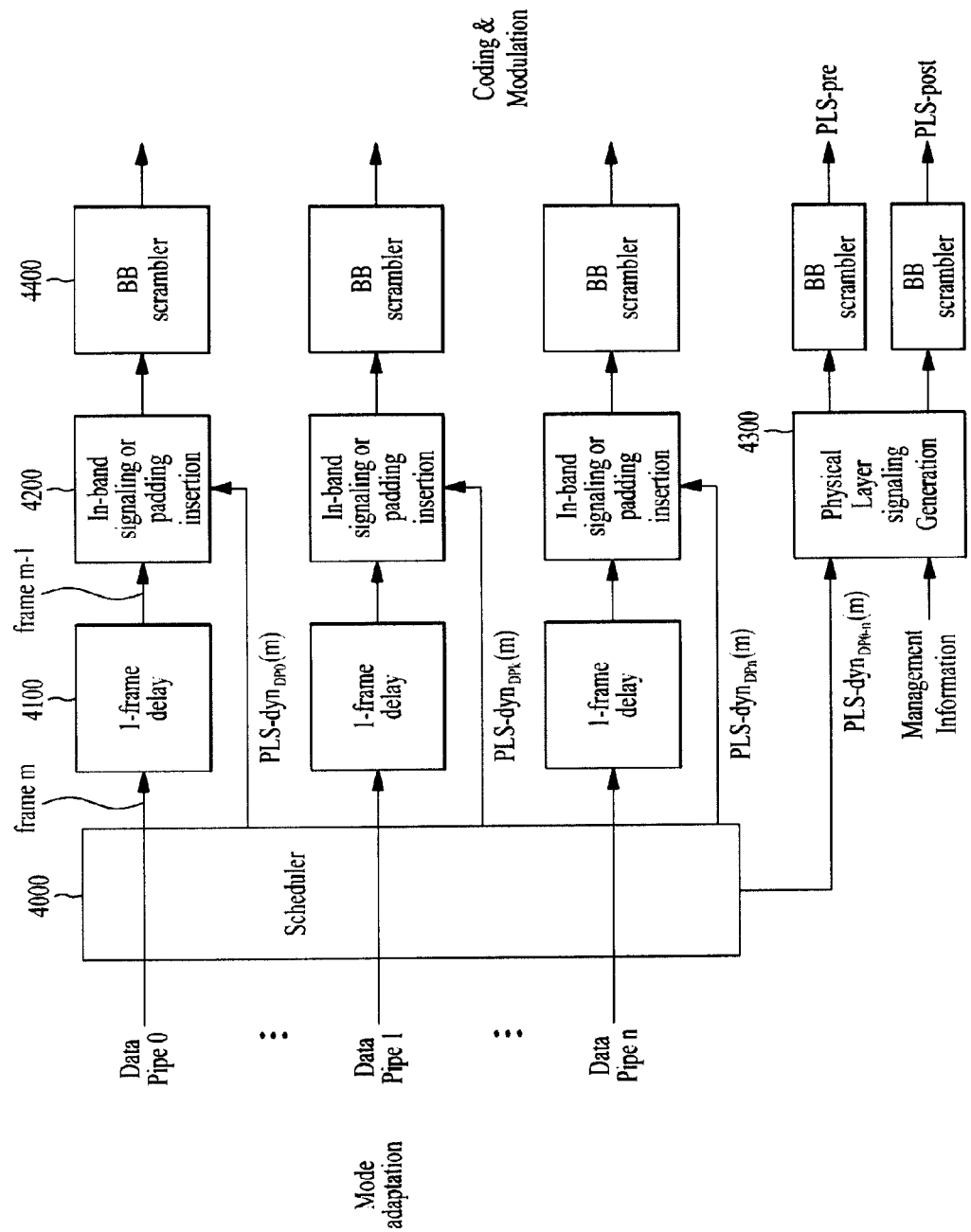
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
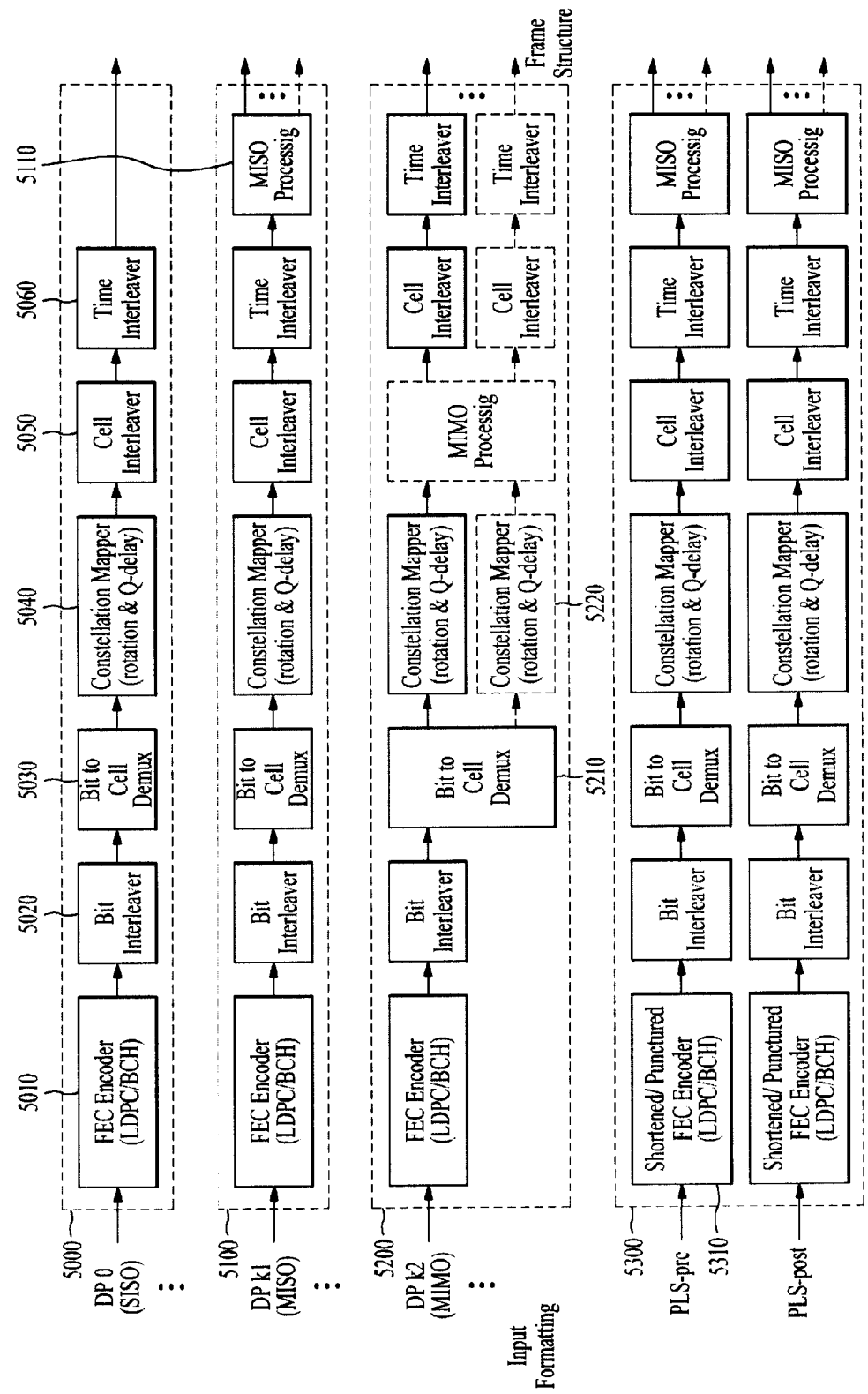
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
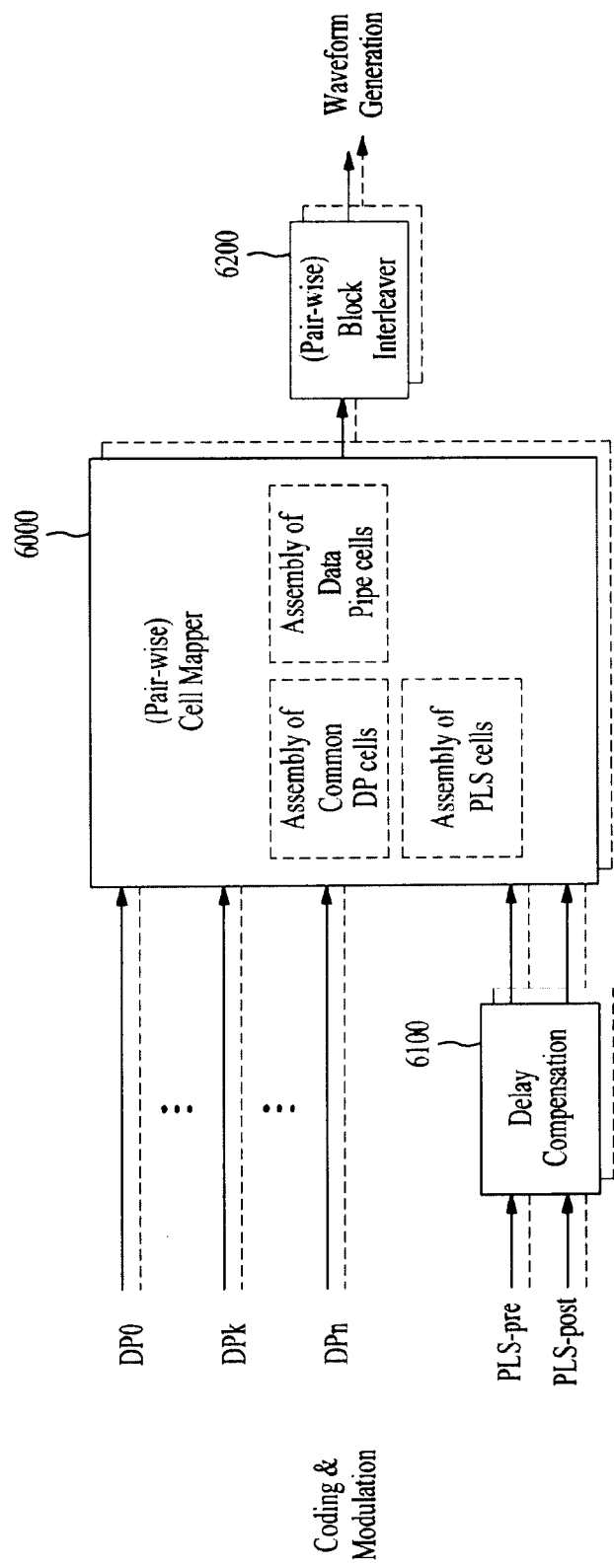
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate (or arrange) cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map (or arrange) the unit to a frame. Accordingly, paired cells in an input path corresponding to an output path of each antenna can be allocated (or arranged) to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
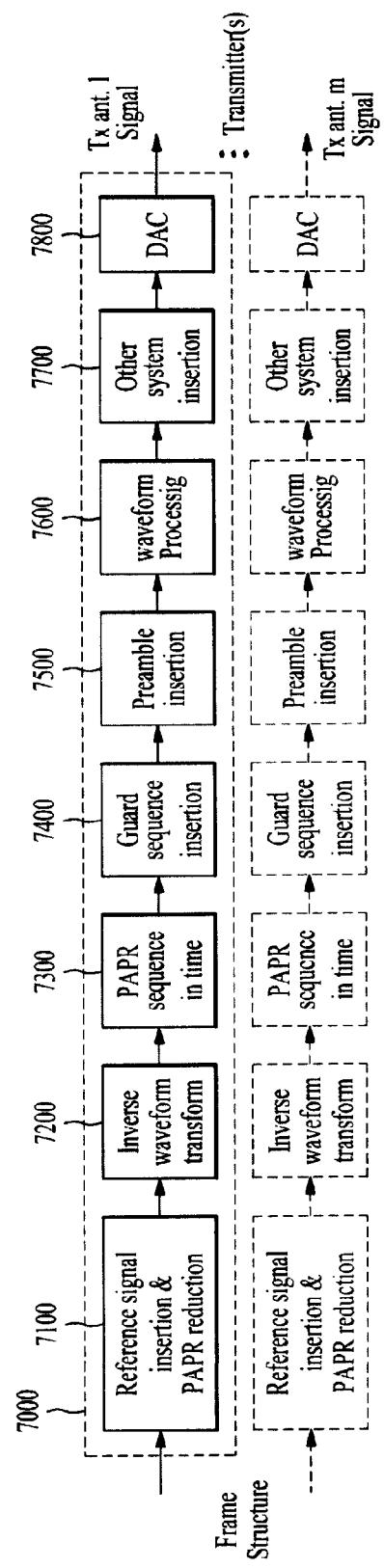
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
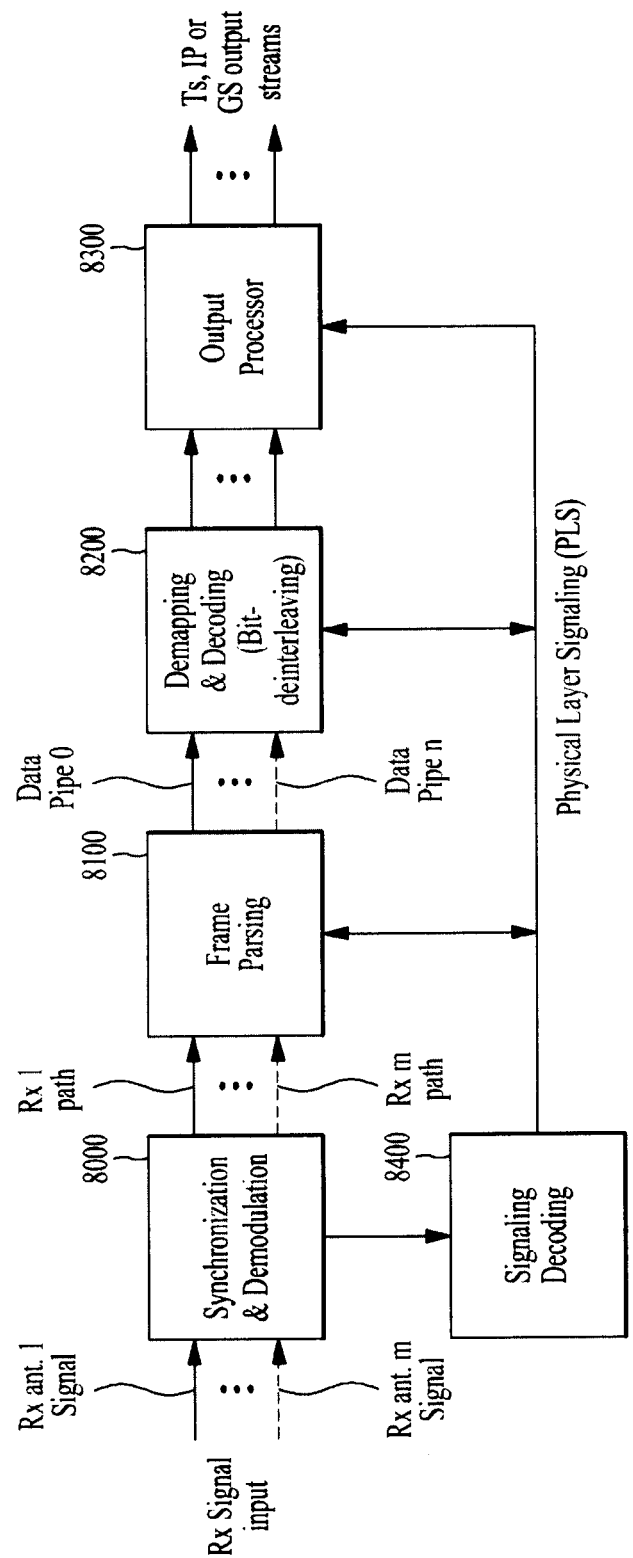
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
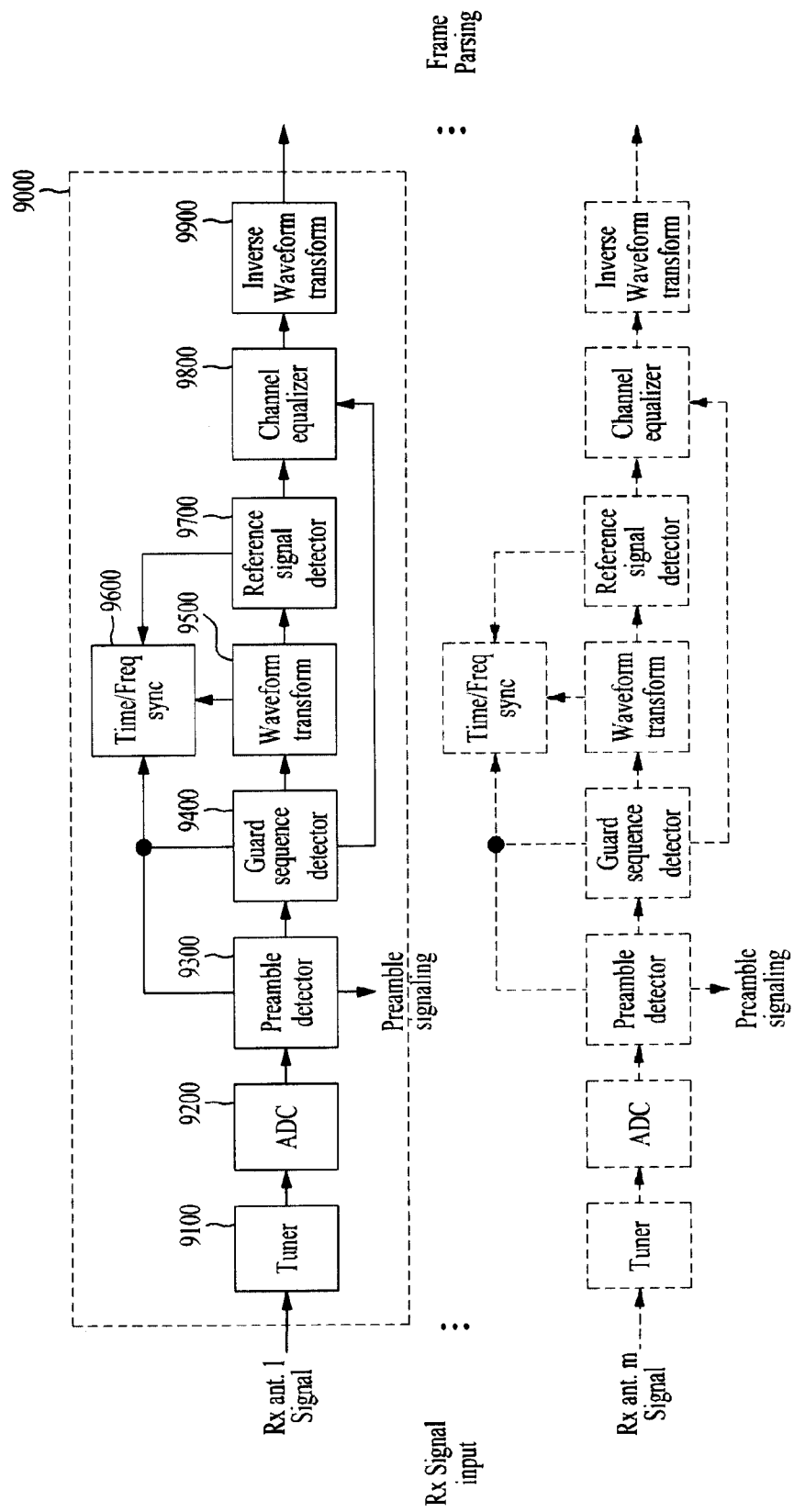
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
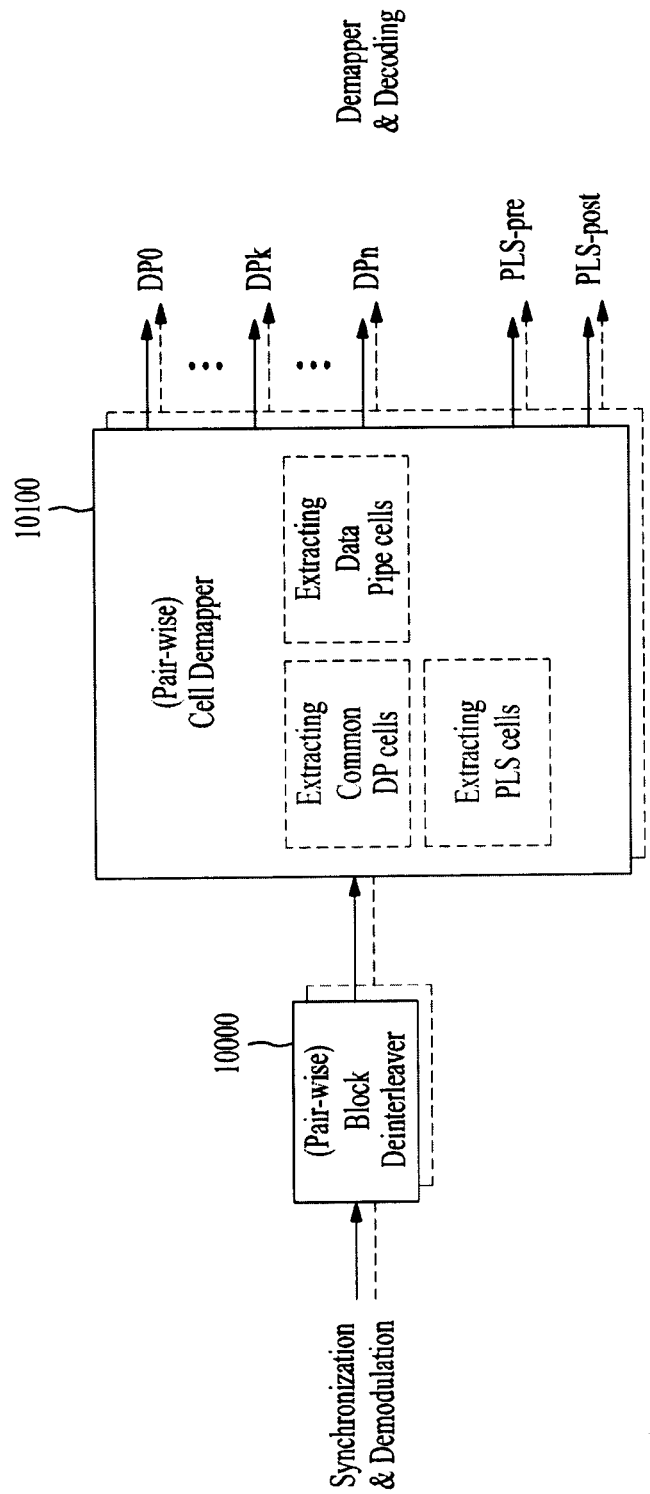
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block interleaver 10000 and at least one cell demapper 10100.

The block interleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block interleaver 10000 can process two consecutive pieces of data as a pair for each input path. Accordingly, the block interleaver 10000 can output two consecutive pieces of data even when deinterleaving has been performed. Furthermore, the block interleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
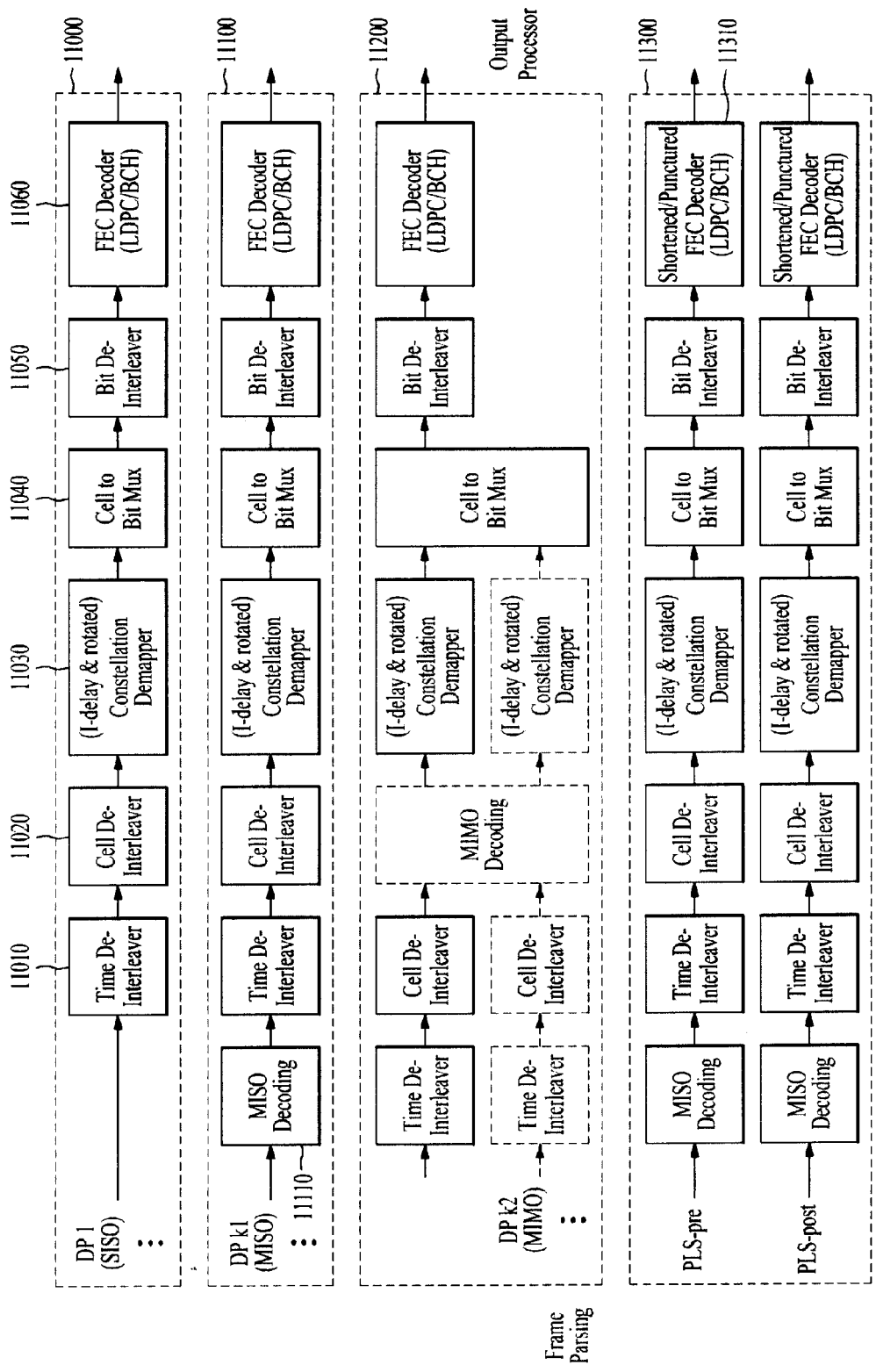
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
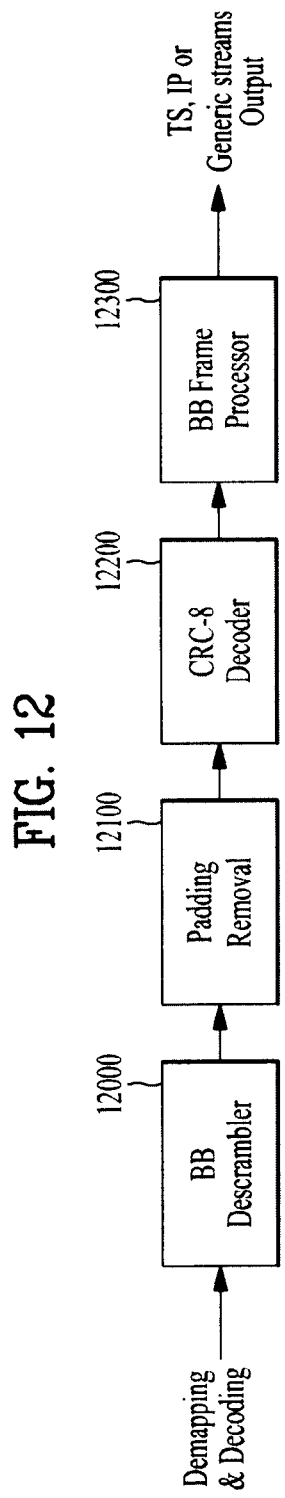
FIG. 12 illustrates an output processor according to an embodiment of the present invention.
Figure 13:
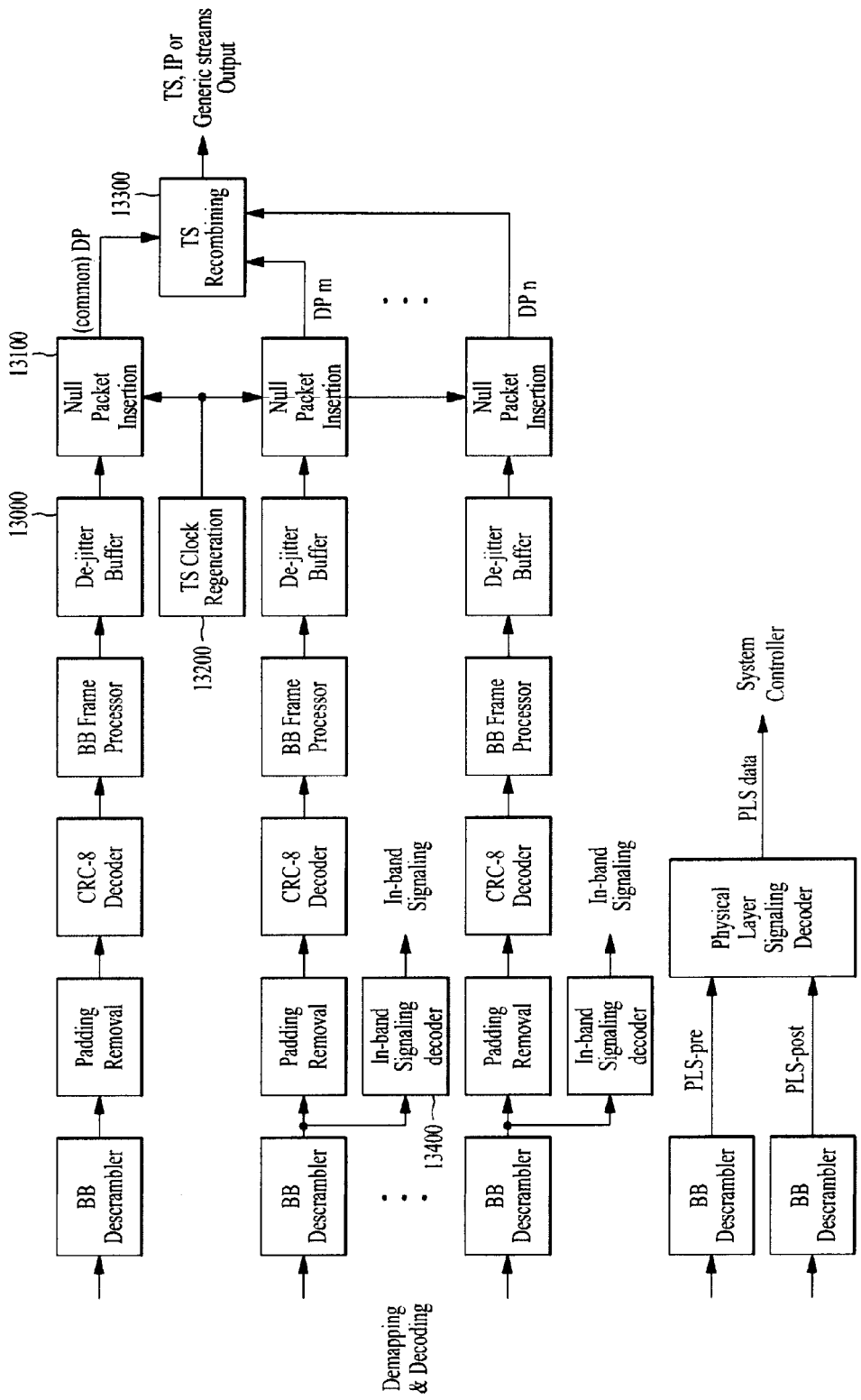
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
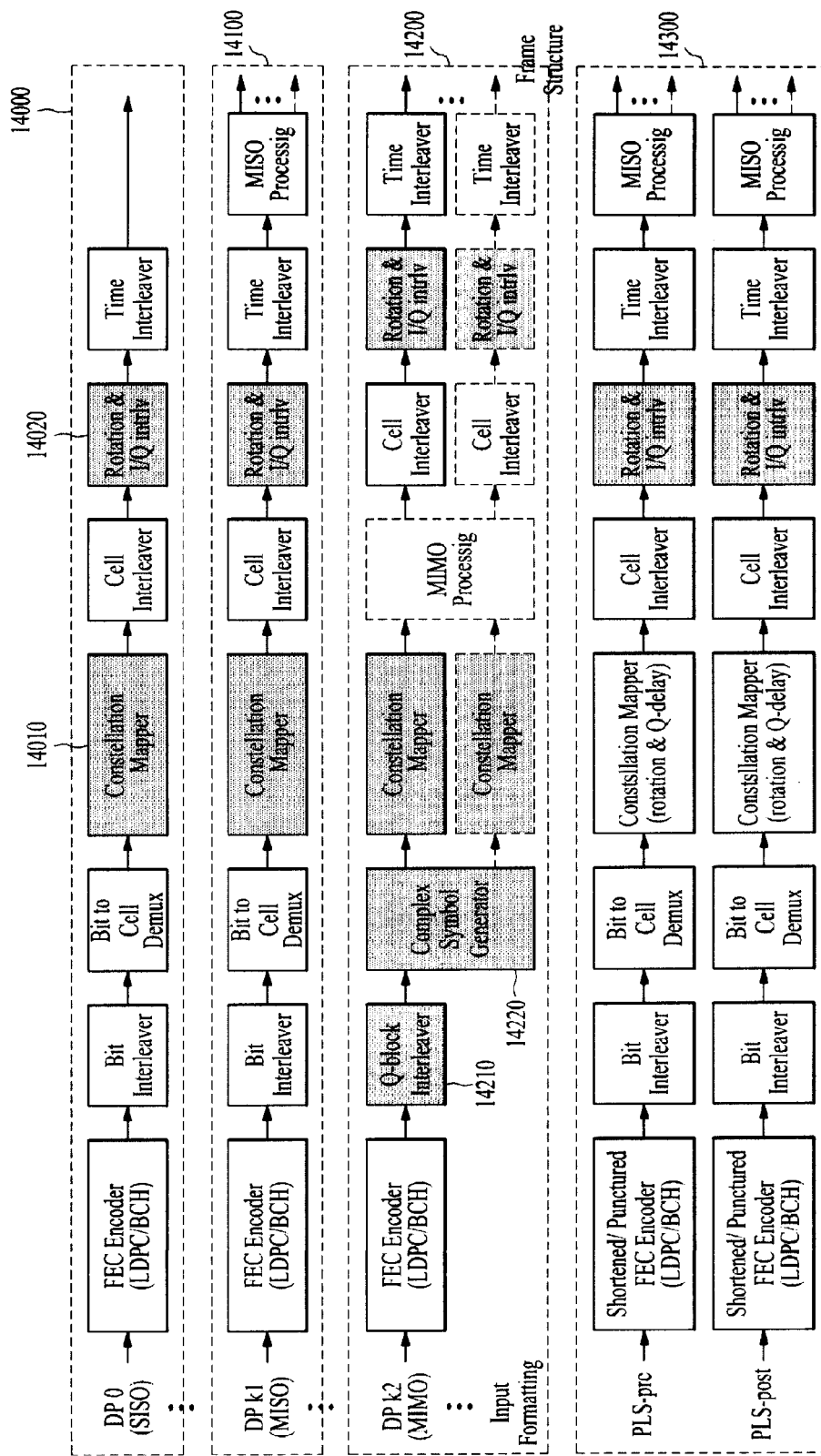
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
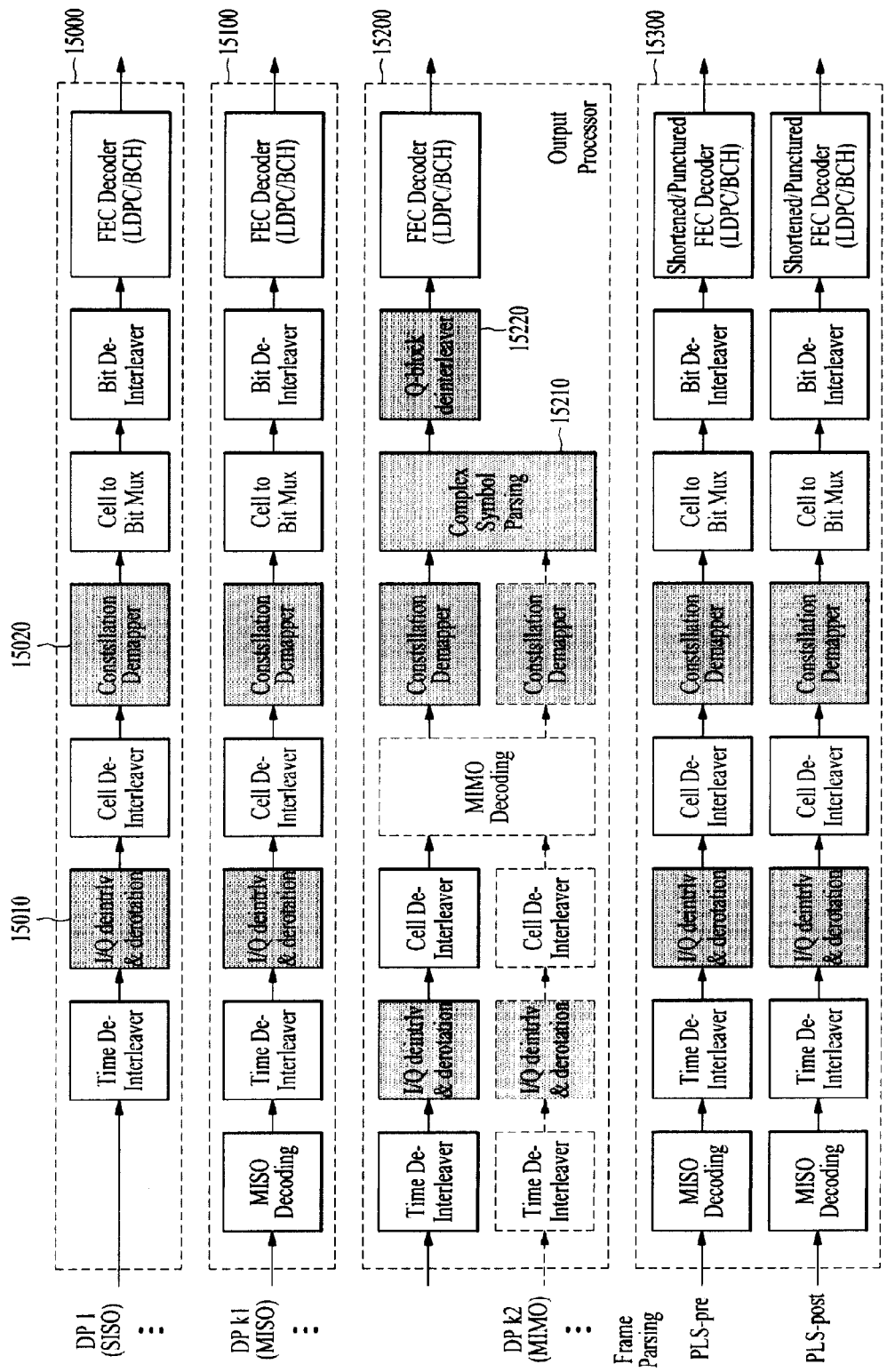
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

Figure 16:
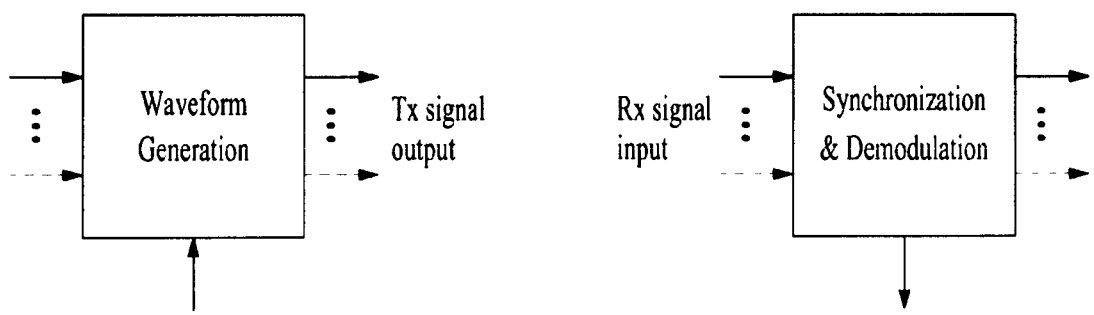
FIG. 16 is a view illustrating a waveform generation module and a synchronization & demodulation module according to another embodiment of the present invention.

FIG. 16 is a view illustrating a waveform generation module and a synchronization & demodulation module according to another embodiment of the present invention.

The present invention relates to a method for determining the presence of a signal for an emergency alert system (EAS), i.e., an EAS signal, in a frame using a preamble thereof. The present invention proposes a preamble structure, a detection method and a management method for determining the presence of an EAS signal. Here, the preamble may be a P1 symbol according to an embodiment. The preamble may include both P1 and L1 signaling parts according to another embodiment. The preamble may indicate an L1 signaling part according to another embodiment.

In addition, the present invention proposes three different P1 structures for determining the presence of an EAS signal. However, the structure of P1 is not limited to the following three types.

Further, the present invention proposes a method for allowing a receiver to detect an EAS signal and wake up from a standby mode for reducing standby power consumption.

The present invention proposes a method for detecting the presence of an EAS signal when the above-described next-generation broadcast system includes the EAS signal. In addition, the present invention relates to a method for efficiently switching from a standby mode to a mode for receiving EAS and normal broadcast signals by detecting the EAS signal. A receiver can wake up by detecting an EAS signal. Further, the present invention also proposes a frame structure related to waking up. The standby mode may be a receiver mode for reducing standby power consumption.

The methods proposed by the present invention may be performed by the above-described waveform generation module. In the present invention, the waveform generation module may insert a preamble generated differently depending on the presence of an EAS signal, into a signal preamble.

In addition, in the case of a receiver end, an operation for detecting the presence of the EAS signal and generating a control signal to switch from a standby mode to a normal Rx mode may be performed by the above-described synchronization & demodulation module. A receiver according to the present invention may detect the presence of the EAS signal using different preamble signals. The present invention proposes a frame structure for processing an EAS signal according to a preamble signal. Further, the present invention proposes an operation for switching from a standby mode to a normal Rx mode (wake-up process).

A detailed description thereof will be given below.

Figure 17:
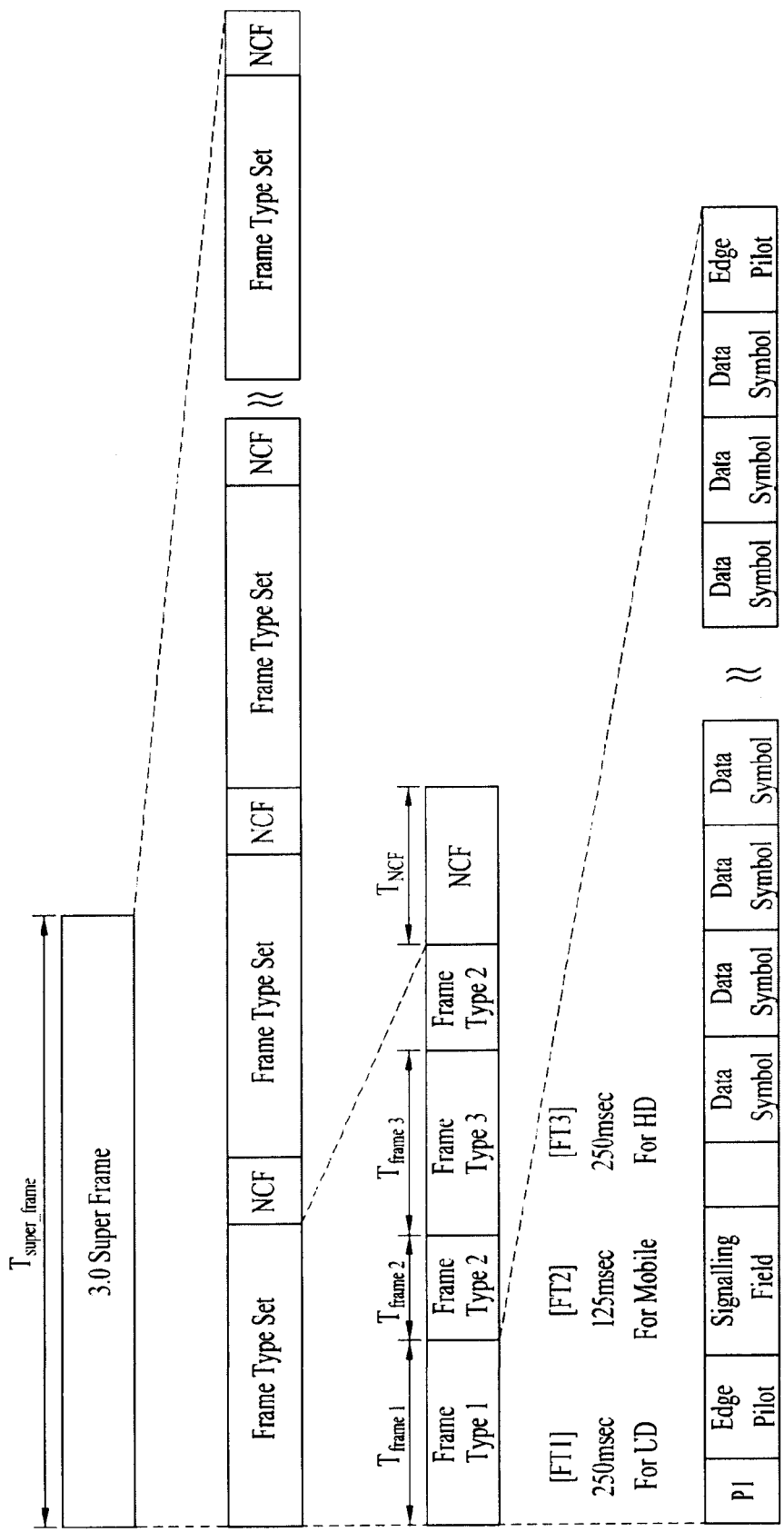
FIG. 17 is a view illustrating the structure of frames according to an embodiment of the present invention.

FIG. 17 is a view illustrating the structure of frames according to an embodiment of the present invention.

The uppermost frame may be a superframe. The superframe may include a certain number of frame type sets and/or next coming frames (NCFs). The number of frame type sets in the superframe may vary according to embodiments. The number of frame type sets in the superframe may be 8 according to an embodiment. The frame type set may also be called a frame repetition unit (FRU) according to an embodiment.

The frame type set may include various types of frames. FIG. 17 shows frame types 1, 2 and 3 which may be, for example, ultra high definition (UD), mobile and high definition (HD) frames respectively. The frame types may vary according to embodiments. According to an embodiment, frame type 1 may be a frame according to a base profile, frame type 2 may be a frame according to a handheld/mobile profile, and frame type 3 may be a future extended frame (FEF). The number of frames in the frame type set may vary according to embodiments.

According to an embodiment, the frame type set may be regarded as a superframe. In the present invention, the superframe may refer to a combination of frames each including a preamble.

Each frame type is illustrated at the bottom of FIG. 17. Each frame may include contiguous data symbols, a signaling field prior thereto, and edge pilots prior and subsequent thereto. A preamble may be located at the very front of the frame to indicate that the frame starts. This preamble may be P1 according to an embodiment. The preamble may include basic information about the structure of the frame.

Figure 18:
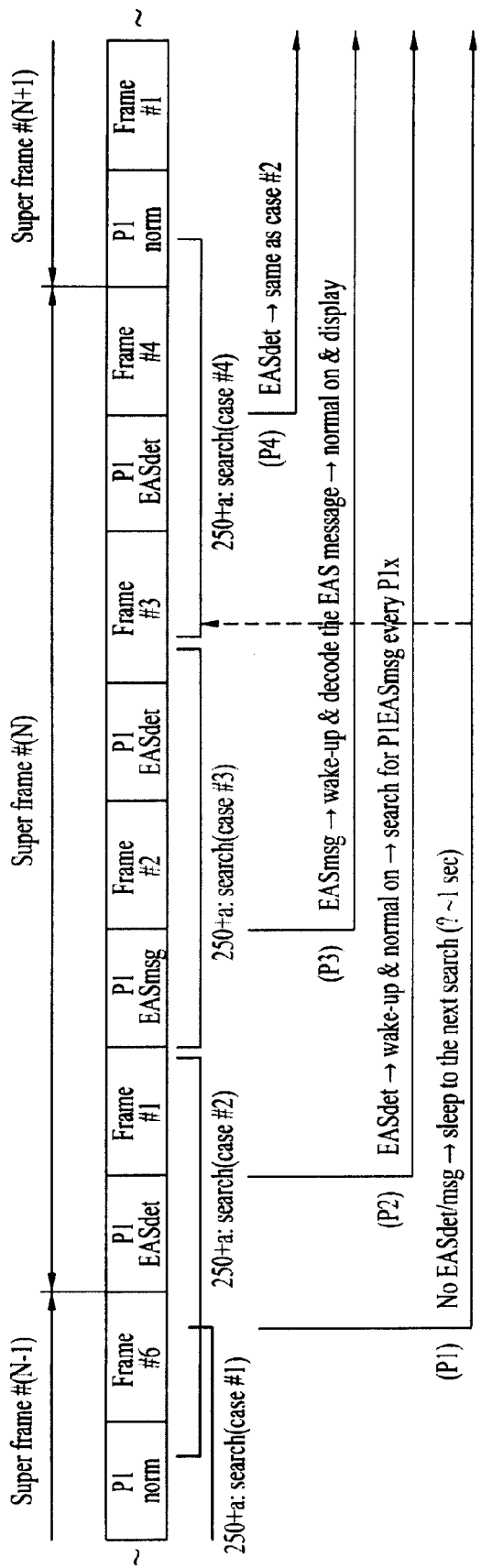
FIG. 18 is a view illustrating an operation method of a receiver in a standby mode according to an embodiment of the present invention.

FIG. 18 is a view illustrating an operation method of a receiver in a standby mode according to an embodiment of the present invention.

To describe the operation method of the receiver in the standby mode, each frame is simplified into P1 (preamble) and a part other than P1. A part marked as frame may include all of edge symbols, a signaling field and data symbols other than P1.

P1 proposed by the present invention may have three types, e.g., P1norm, P1EASdet and P1EASmsg.

P1norm may be a preamble of a frame not related to EAS. P1norm may be a preamble of a normal frame.

P1EASdet may be a preamble used when EAS data is included in another frame of a superframe including a corresponding frame but the corresponding frame itself does not include EAS data. Based on other embodiment, P1EASdet may be a preamble used when EAS data is included in another frame of a certain frame group other than a superframe and a corresponding frame itself does not include EAS data. That is, a unit for determining whether a frame including EAS data is present may be a non-superframe or an appropriate number of frames. Here, the certain frame group may be contiguous frames. The number of frames included in a frame group may vary according to embodiments. For example, P1EASdet may be a preamble of any one of a certain number of frames and indicate that another one of the frames includes EAS data. A range covered by P1EASdet, i.e., the number of frames in a frame group, may be indicated by information in the preamble. According to another embodiment, P1EASdet may indicate that the frame transmitted/received after the corresponding frame includes EAS data. That is, P1EASdet may indicate that at least one of the frames transmitted/received after the frame including P1EASdet includes EAS data. In this case, the frame including P1EASdet may not include EAS data.

P1EASmsg may be a preamble used as a preamble of a frame including EAS data.

The above-described three types of preambles may have a certain small cross-correlation value and a certain small autocorrelation value. Accordingly, when the receiver takes correlation for a specific preamble, a large correlation value may be acquired only when the corresponding preamble is received. Using this, the receiver may determine whether P1norm, P1EASdet or P1EASmsg is received.

A sequence may be used to generate a preamble. A detailed description thereof will be given below. Different sequences may be used to generate different preambles. P1norm may be generated using a normal sequence. P1EASdet and P1EASmsg may be generated using an EAS sequence. That is, P1norm may be distinguished from P1EASdet and P1EASmsg by a sequence used to generate P1norm. P1EASdet and P1EASmsg may further include flag information indicating whether a corresponding frame includes an EAS signal. The flag information may be expressed using 1 bit. Whether a corresponding frame includes an EAS signal may be determined using flag information in a preamble.

Superframe #(N) indicates an Nth superframe. In the same manner, superframe #(N−1) and superframe #(N+1) respectively indicate superframes immediately prior and subsequent to superframe #(N). In view of the receiver, superframe #(N−1) may be received prior to superframe #(N). FIG. 18 illustrates a case in which a frame including an EAS signal is present in superframe #(N).

According to the embodiment of FIG. 18, superframe #(N−1) may include a total of 6 frames. FIG. 18 illustrates only the last frame, e.g., frame #6, of superframe #(N−1) and only the first frame of Superframe #(N+1). Superframe #(N) may have a total of 4 frames in the current embodiment. The frame including an EAS signal may be frame #2. Accordingly, a preamble of frame #2 may use P1EASmsg indicating that the frame includes an EAS signal. Frames of superframe #(N) other than frame #2 may use P1EASdet indicating that the frame including an EAS signal is present in a corresponding superframe, as a preamble.

The receiver may have a normal Rx mode and a standby mode. In the normal Rx mode, the receiver may be turned on to receive a broadcast signal. In the standby mode, the receiver may be in a state for reducing consumption of standby power.

In the normal Rx mode, the receiver may be aware of the structures of superframes and frames. Accordingly, the receiver may detect P1 only in a period near a preamble. When P1EASmsg is detected, the receiver may process EAS data. If the receiver is not aware of the structures of superframes and frames, the receiver may detect P1 while a block for detecting characteristics of P1 is always turned on. The block for detecting characteristics of P1 may perform the above-described operation for detecting various types of P1. This block may be called a P1 characteristic detection block.

Case #1 to case #4 illustrated in FIG. 18 may correspond to embodiments of the operation method of the receiver in the standby mode.

When the receiver is in the standby mode, if the P1 characteristic detection block is always turned on to detect P1EASdet/P1EASmsg, power consumption corresponding thereto always occurs. Accordingly, the present invention proposes a method for turning on the P1 characteristic detection block not always but at regular intervals in the standby mode of the receiver. In addition, the present invention proposes a frame structure appropriate for operation of the P1 characteristic detection block when the P1 characteristic detection block is turned on at regular intervals, and a processing method thereof.

Case #1 to case #4 may indicate times when the P1 characteristic detection block is turned on. (P1) to (P4) may correspond to embodiments of the operation method of the receiver in case #1 to case #4 depending on a detection result of the P1 characteristic detection block.

In each case, 250+a may indicate a time for which the P1 characteristic detection block is turned on, in milliseconds (msec.). Here, the time for which the P1 characteristic detection block is turned on is not limited thereto. 250+a msec. may be a time for which the P1 characteristic detection block is turned on in an embodiment in which a frame has a maximum length of 250 msec. When a frame has a maximum length of 250 msec., the P1 characteristic detection block may be turned on for a time obtained by adding a, which is a margin time, to the maximum length of the frame. This serves to detect characteristics of at least one P1 when the P1 characteristic detection block is turned on. If a frame has a maximum length of B msec., the time for which the P1 characteristic detection block is turned on may be B+a. In this case, a may be an arbitrary value equal to or greater than 0. Here, a is preferably less than B.

In addition, a cycle of turning on the P1 characteristic detection block may be equal to or less than the length of a superframe. If the cycle is greater than the length of the superframe, the P1 characteristic detection block may not wholly detect the superframe. In this case, the P1 characteristic detection block may not detect P1EASdet/ P1EASmsg signals.

Case #1 may be a case in which the P1 characteristic detection block is turned off in a frame immediately prior to superframe #(N) including a frame including EAS data. In this case, only P1norm may be detected and thus an operation of (P1) may be performed. Since the detected P1 is not P1EASdet/P1EASmsg, the receiver may be maintained in the standby mode. The P1 characteristic detection block may be turned on in a subsequent detection time to detect P1 characteristics.

In case #1, if the cycle of turning on the P1 characteristic detection block again is less than the length of the superframe, this may correspond to the procedure of case #4 as indicated by a dashed arrow extending from (P1). In this case, the receiver wakes up and subsequent P1EASmsg may be detected by the P1 characteristic detection block. If the cycle of turning on the P1 characteristic detection block again is greater than the length of the superframe, P1EASdet/P1EASmsg may not be detected as indicated by a solid line extending from (P1). Although EAS data is present in superframe #N, since the P1 characteristic detection block is turned off throughout superframe #N, P1EASdet/P1EASmsg may not be detected. Accordingly, the receiver may determine that EAS data is not present, and thus may not perform an appropriate operation for the EAS data.

Case #2 may be a case in which the P1 characteristic detection block is turned on in a frame prior to a frame including EAS data. At this time, the P1 characteristic detection block may detect P1EASdet. In this case, a procedure of (P2) may be performed. When P1EASdet is detected, the receiver wakes up and may receive a normal broadcast signal. In addition, the receiver may detect P1 whenever P1 is received. This serves to detect P1EASmsg. In this embodiment, since P1EASmsg will be detected immediately after P1EASdet is detected, EAS data may be directly processed in a corresponding superframe using P1EASmsg. If P1EASmsg is present in another superframe according to an embodiment, EAS data may be acquired and processed when that superframe is received.

Case #3 may be a case in which P1EASmsg is detected immediately after the P1 characteristic detection block is turned on. In this case, the receiver wakes up and may directly process EAS data. The receiver may process a normal broadcast signal after processing the EAS data. The EAS data may also be called an EAS message.

Case #4 may be a case in which the P1 characteristic detection block is turned on after a frame including EAS data (frame having P1EASmsg) has been passed. In this embodiment, the P1 characteristic detection block may detect P1EASdet. As in case #2, the receiver wakes up and may detect P1 whenever P1 is received, while receiving a normal broadcast signal. This serves to detect P1EASmsg. In the current embodiment, since a frame including P1EASmsg in a corresponding superframe has already been passed, the P1 characteristic detection block may detect P1EASmsg in a subsequent superframe including EAS data. As such, the receiver may acquire and process the EAS data.

Figure 19:
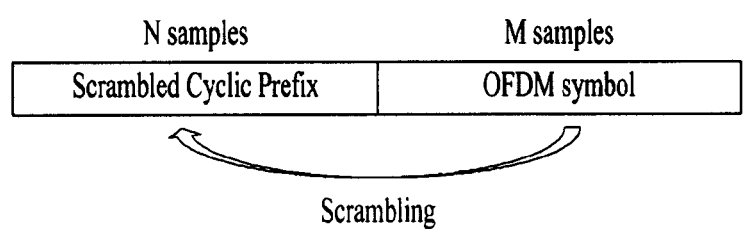
FIG. 19 is a view illustrating the structure of P1 according to an embodiment of the present invention.

FIG. 19 is a view illustrating the structure of P1 according to an embodiment of the present invention.

P1 may have a basic structure including an OFDM symbol and a guard interval. The guard interval may be located prior to the OFDM symbol. The OFDM symbol may have M samples and have frame information of the frequency domain. The guard interval corresponds to a scrambled cyclic prefix and may have N samples.

The scrambled cyclic prefix may be generated by scrambling the OFDM symbol with a scrambling sequence. A detailed description of a procedure thereof will be given below.

Figure 20:
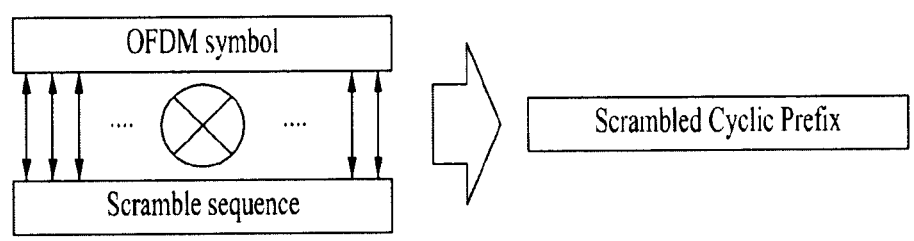
FIG. 20 is a view illustrating a scrambling procedure for generating a guard interval of P1 according to an embodiment of the present invention.

FIG. 20 is a view illustrating a scrambling procedure for generating a guard interval of P1 according to an embodiment of the present invention.

The scrambling procedure according to the current embodiment may be a scrambling procedure for generating the above-described P1norm. A scrambling sequence may have two types, e.g., a normal sequence used to generate P1norm and an EAS sequence used to generate P1EASdet and P1EASmsg. A description is now given of a procedure for generating P1norm using a normal sequence.

A scrambled cyclic prefix may be generated using an OFDM symbol and a scrambling sequence. N samples from the end of the OFDM symbol may be copied and multiplied by the scrambling sequence. Here, the scrambling sequence may also be called a scramble sequence. The scrambling sequence may be a sequence having a length of N samples. As described above, N samples from the end of the OFDM symbol may be taken and then multiplied by the scrambling sequence on a sample basis. The scrambled cyclic prefix may be generated through the above procedure. This scrambled cyclic prefix may correspond to a guard interval of P1. The guard interval may be located prior to the OFDM symbol.

If the scrambled cyclic prefix is denoted by Scp, Scp may be expressed as $Scp[n]=D[n]*S[n]$. Here, $D[n]$ may denote each sample value of the OFDM symbol and $S[n]$ may denote an nth value of the scrambling sequence, where n may denote the index of a sample. At this time, the range of n may be expressed as $0 \leq n \leq N-1$. N denotes the length of the scrambling sequence and may be the same as the length of the scrambled cyclic prefix.

Figure 21:
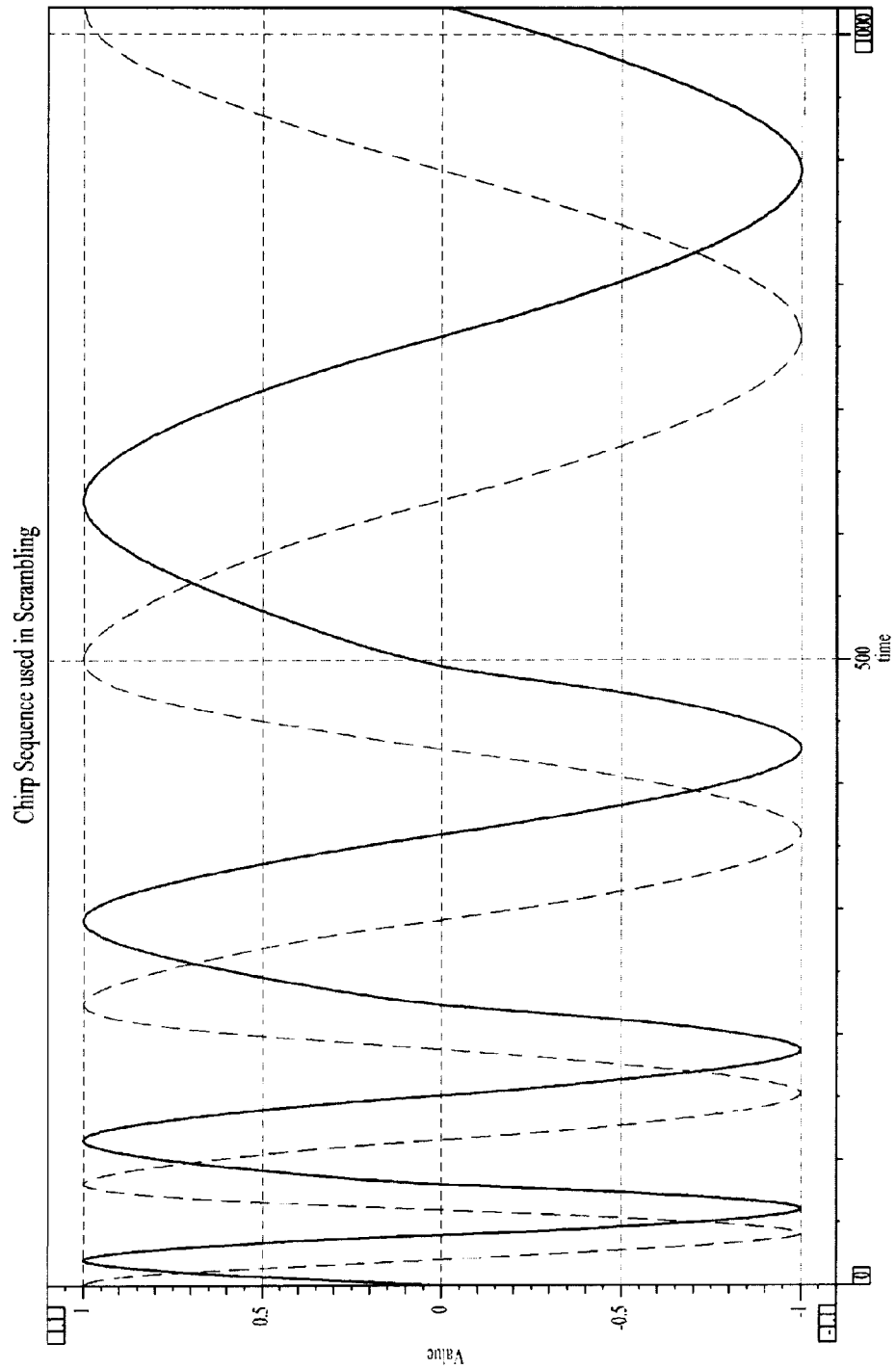
FIG. 21 is a view illustrating a scrambling sequence according to an embodiment of the present invention.

FIG. 21 is a view illustrating a scrambling sequence according to an embodiment of the present invention.

The present invention proposes a chirp sequence as an example of the scrambling sequence. As illustrated in FIG. 21, the chirp sequence may have a cycle the length of which gradually increases.

As in the current embodiment, if the chirp sequence is a complex number sequence, the chirp sequence may be expressed as given below.

$$Sc[n]=\cos(f[l])+j*\sin(f[l])) \quad \text{[Equation 1]}$$

l=0, if 0≤n<Pf0
l=k, if Pf(k−1)≤n<Pf(k−1)+Pfk, l>0

Here, j denotes a symbol indicating an imaginary number and Sc[n] may be an nth scrambling sequence value. Sc[n] is expressed as a complex number. f[l] denotes a phase value corresponding to an lth frequency. l=0 may correspond to the first frequency and the highest frequency. As l increases, the frequency may decrease. Accordingly, as l increases, the length of a cycle of a corresponding frequency may increase. Pfk may denote the number of samples in a cycle of a kth frequency. Accordingly, Pf0 may indicate the number of samples in a cycle corresponding to the first (0th) frequency.

The present invention proposes a binary chirp sequence as another example of the scrambling sequence.

The scrambling sequence may have a real binary value. The binary chirp sequence may be an example of a case in which the scrambling sequence has a real binary value. The binary chirp sequence may have a value of 1 when the value S[n] of the chirp sequence is greater than or equal to 0 and have a value of −1 when the value S[n] is less than 0. The value Sb[n] of the binary chirp sequence may be expressed as given below.

$$Sb[n]=1 \text{ if } S[n]\geq 0,$$

$$Sb[n]=-1 \text{ if } S[n]<0, 0\leq n\leq N-1 \quad \text{[Equation 2]}$$

Here, N may denote a total length of the scrambling sequence. A binary value for saving the binary chirp sequence may be expressed as given below.

$$Sbm[n]=0 \text{ if } Sb[n]=1,$$

$$Sbm[n]=1 \text{ if } Sb[n]=-1, 0\leq n\leq N-1 \quad \text{[Equation 3]}$$

The binary value for saving may be denoted by Sbm[n]. 0 may be saved in Sbm[n] if Sb[n] is 1, and 1 may be saved in Sbm[n] if Sb[n] is −1. The above saving scheme of Equation 3 is merely an embodiment and saving according to another rule is also possible.

The scrambling sequence may be one of other sequences as well as the above-described chirp sequence and the binary chirp sequence. For example, any specific sequence having a small correlation between normal order and reverse order is usable. This may be expressed as given below.

$$\text{Sum of } (S[n]*S[N-1-n]))<c_{min}, \text{ for } n=0,1,\ldots,N-1. \quad \text{[Inequality 4]}$$

N may denote the length of a sequence. cmin denotes a specific value, and a sequence a correlation value of which is less than the specific value cmin may be used as the scrambling sequence. S[n] may denote an nth value of the sequence.

Figure 22:
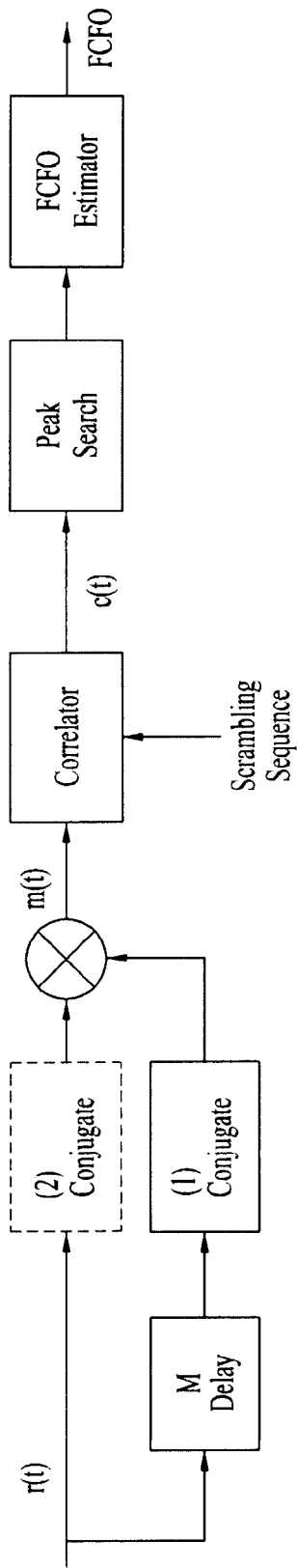
FIG. 22 is a view illustrating a detector according to an embodiment of the present invention.

FIG. 22 is a view illustrating a detector according to an embodiment of the present invention.

The detector according to an embodiment of the present invention may include an M delay block, a conjugate block, a correlator block, a peak search block and/or a fractional carrier frequency offset (FCFO) estimator block.

The M delay block may delay a received signal by M. If the received signal is delayed by M, a scrambled cyclic prefix part may be calculated at the same point of time as an original data part.

The conjugate block may switch the sign of an imaginary number part of a complex signal from negative to positive or from positive to negative. That is, the conjugate block may perform an operation for multiplying the imaginary number part of the complex signal by '−1'. If a scrambling sequence has a real value, a conjugate block (1) of FIG. 22 may be used. If a scrambling sequence has a complex value, a conjugate block (2) of FIG. 22 may be used. According to an embodiment, the conjugate blocks (1) and (2) may be used simultaneously.

As described above, if the received signal is delayed by M, the delayed scrambled cyclic prefix signal part may be calculated at the same point of time as the original data signal part. As illustrated in FIG. 22, a signal delayed by M and then conjugated may be multiplied by an original data signal. A result value of this operation may always have a positive value irrespective of the sign of the original data signal. This operation may be expressed as given below. The following equation may assume that white noise normally generated by a system is excluded. The following equation also assumes that a scrambling sequence has a real value.

$$r(t)=D(t)*S(t),S(t)$$

$$m(t)=\text{conj}(r(t))*D(t)=S(t)*\text{conj}(D(t))*D(t)=S(t)*|D(t)|^2 \quad \text{[Equation 5]}$$

In Equation 5, conj( ) denotes conjugate operation. A result m(t) obtained by multiplying a signal passed through the M delay block and the conjugate block (1) by an original signal as shown in Equation 5 may be expressed as a product of a scrambling sequence signal S(t) and power of an original data signal D(t). The signal D(t) is a specific signal made by a system and power thereof may be constant or random. Further, the sign thereof may always be positive.

The correlator block may correlate the signal m(t) with a scrambling sequence. As such, a signal c(t) may be acquired. A description of a result of the signal c(t) will be given below with reference to FIG. 23.

The peak search block may find a peak in the signal c(t). The FCFO estimator block may estimate a fractional carrier frequency offset (FCFO) using characteristics of the peak. This FCFO value may be sent to an FCFO compensation block.

The above-described procedure may be an embodiment of a general procedure for detecting P1 using a scrambling sequence of P1.

Figure 23:
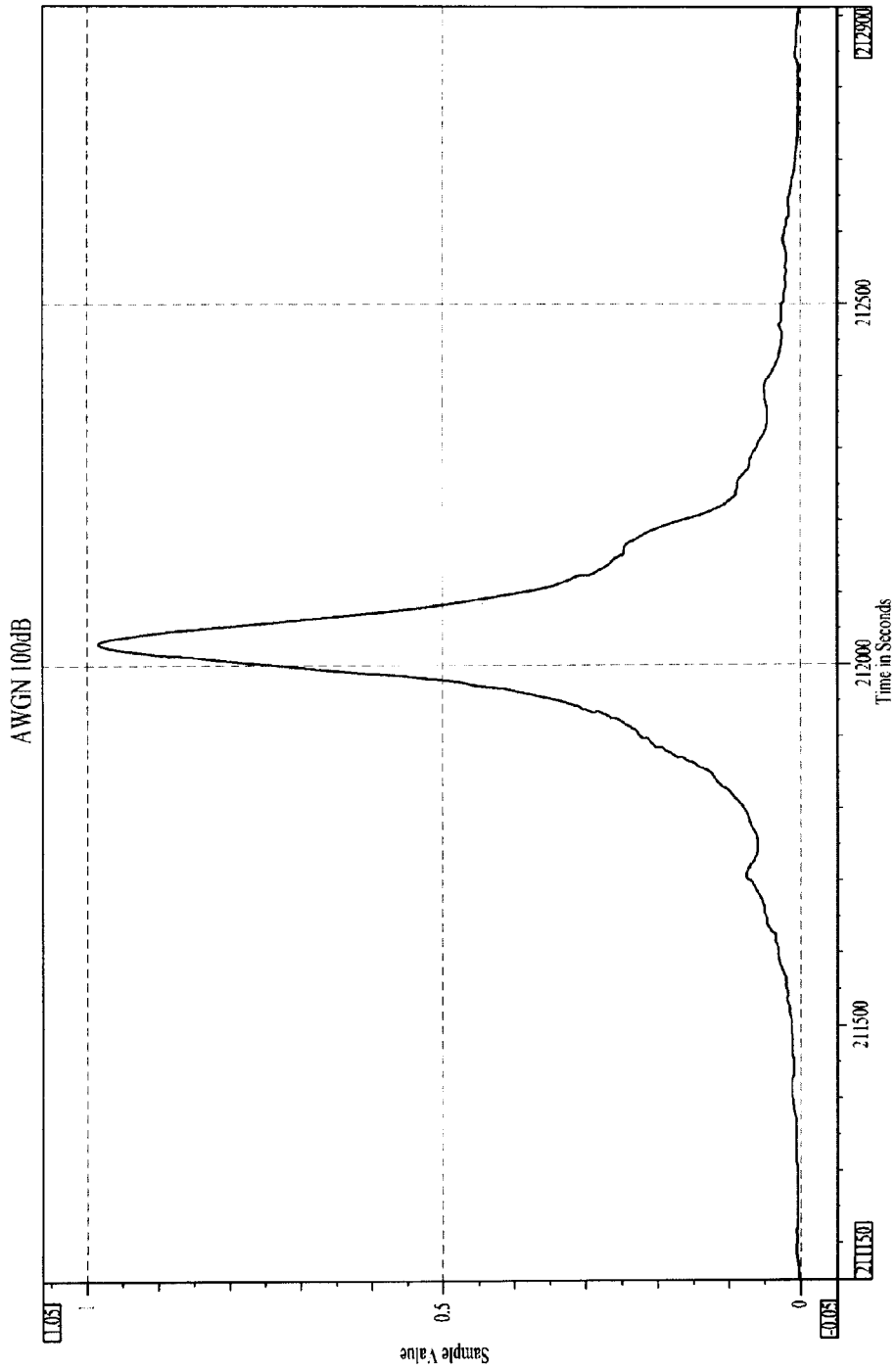
FIG. 23 is a view illustrating the signal c(t) according to an embodiment of the present invention.

FIG. 23 is a view illustrating the signal c(t) according to an embodiment of the present invention.

As described above, the correlator block may correlate the signal m(t) with a scrambling sequence. As such, the signal c(t) may be acquired. The signal c(t) may be an output of the correlator block.

It is noted that the signal c(t) has a peak value as described above. Using this, an FCFO may be estimated.

Figure 24:
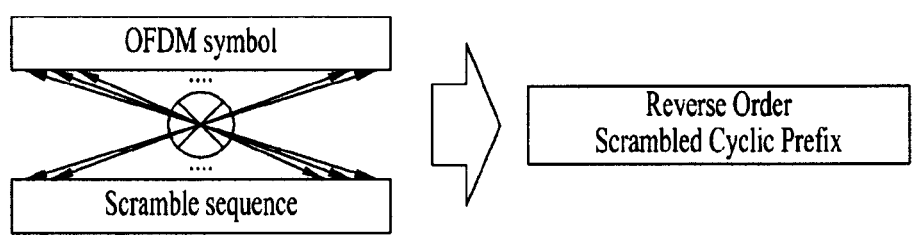
FIG. 24 is a view illustrating a scrambling procedure according to another embodiment of the present invention.

FIG. 24 is a view illustrating a scrambling procedure according to another embodiment of the present invention.

The scrambling procedure according to the current embodiment may be a scrambling procedure for generating the above-described P1EASdet and P1EASmsg.

Like P1norm, P1EASdet and P1EASmsg may also have the above-described basic structure of P1. However, in the case of P1EASdet and P1EASmsg, a scrambling procedure for generating a scrambled cyclic prefix may differ. As described above, P1EASdet and P1EASmsg may be generated using an EAS sequence. This scrambling method may be called reverse order scrambling. In the following description, EAS P1 may refer to P1EASdet or P1EASmsg.

In the present invention, P1 may be generated differently depending on the presence of an EAS signal and then transmitted. As such, a receiver may easily detect the presence of the EAS signal. When an EAS signal is not present, P1norm may be generated and transmitted in the first part of a frame. When an EAS signal is present, EAS P1 may be generated and transmitted in the first part of a frame.

In the scrambling procedure for generating EAS P1, scrambling may be performed in reverse order of that of the scrambling procedure for generating P1norm. That is, instead of multiplying samples of an OFDM symbol by values of a scrambling sequence sequentially from the last sample of the OFDM symbol and the scrambling sequence, the last sample of the OFDM symbol may be multiplied by the first value of the scrambling sequence. In addition, the penultimate sample of the OFDM symbol may be multiplied by the second value of the scrambling sequence. In this manner, an Nth sample from the end of the OFDM symbol may be multiplied by an Nth value of the scrambling sequence. This may be called reverse order scrambling. According to an embodiment, an EAS sequence may be scrambled with the OFDM symbol using a method other than reverse order scrambling. According to another embodiment, an EAS sequence may be scrambled in sequential order for generating P1norm. According to another embodiment, a normal sequence may be multiplied by the OFDM symbol through reverse order scrambling. This case may yield the same result as that achieved when a reverse sequence of the normal sequence is scrambled in sequential order for generating P1norm. At this time, according to an embodiment, the above-described reverse sequence of the normal sequence may be an EAS sequence.

Reverse order scrambling may be expressed as given below.

$$Scp[n]=D[n]*S[N-1-n],\ 0 \leq n \leq N-1 \quad \text{[Equation 6]}$$

Here, N may denote the length of a sequence. Scp denotes a scrambled cyclic prefix after reverse order scrambling and this may be called a reverse order scrambled cyclic prefix.

Figure 25:
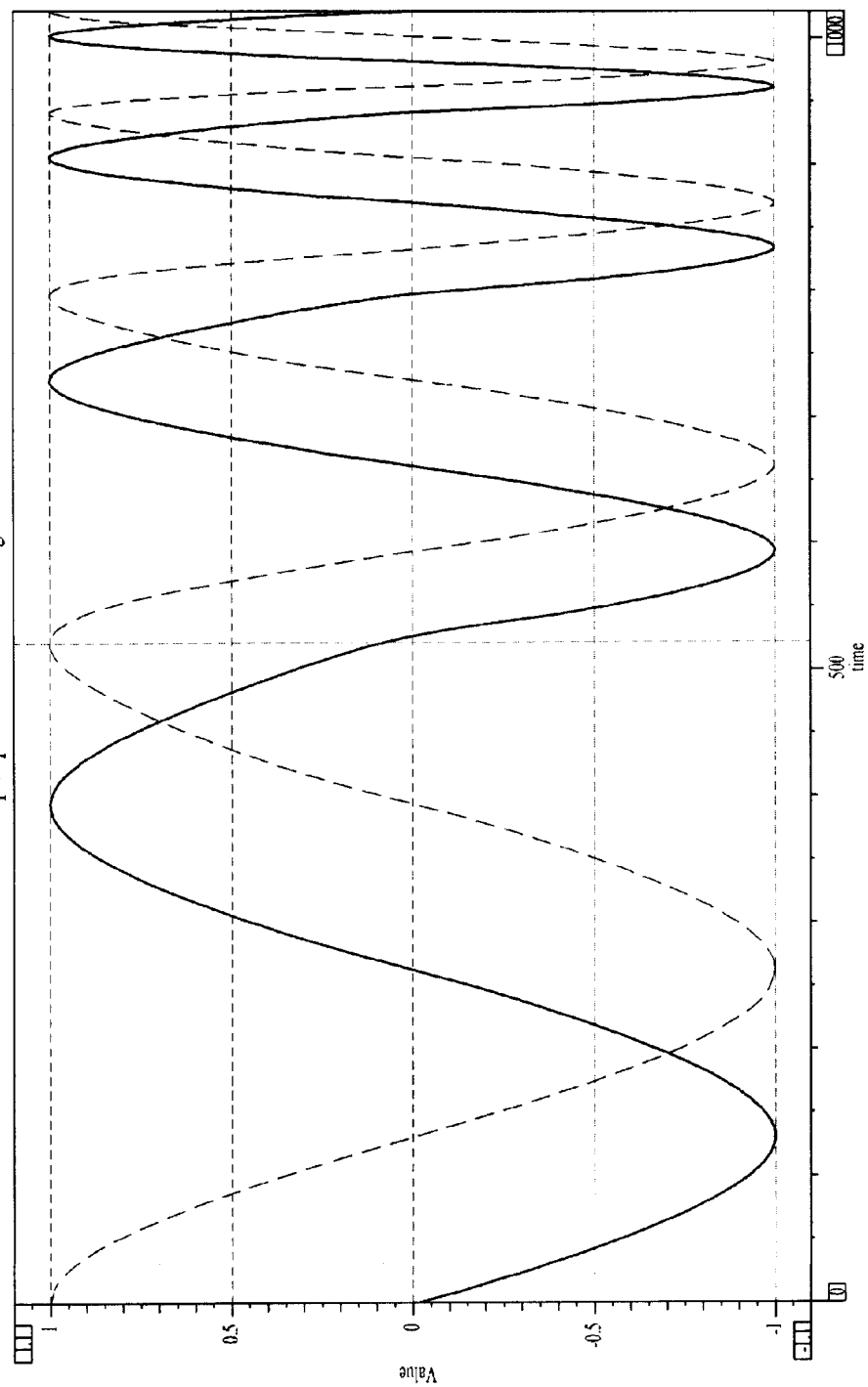
FIG. 25 is a view illustrating a scrambling sequence according to another embodiment of the present invention.

FIG. 25 is a view illustrating a scrambling sequence according to another embodiment of the present invention.

The present invention further proposes a chirp sequence illustrated in FIG. 25 as another example of the scrambling sequence. Unlike the above-described chirp sequence, this chirp sequence may have a cycle the length of which gradually decreases.

Figure 26:
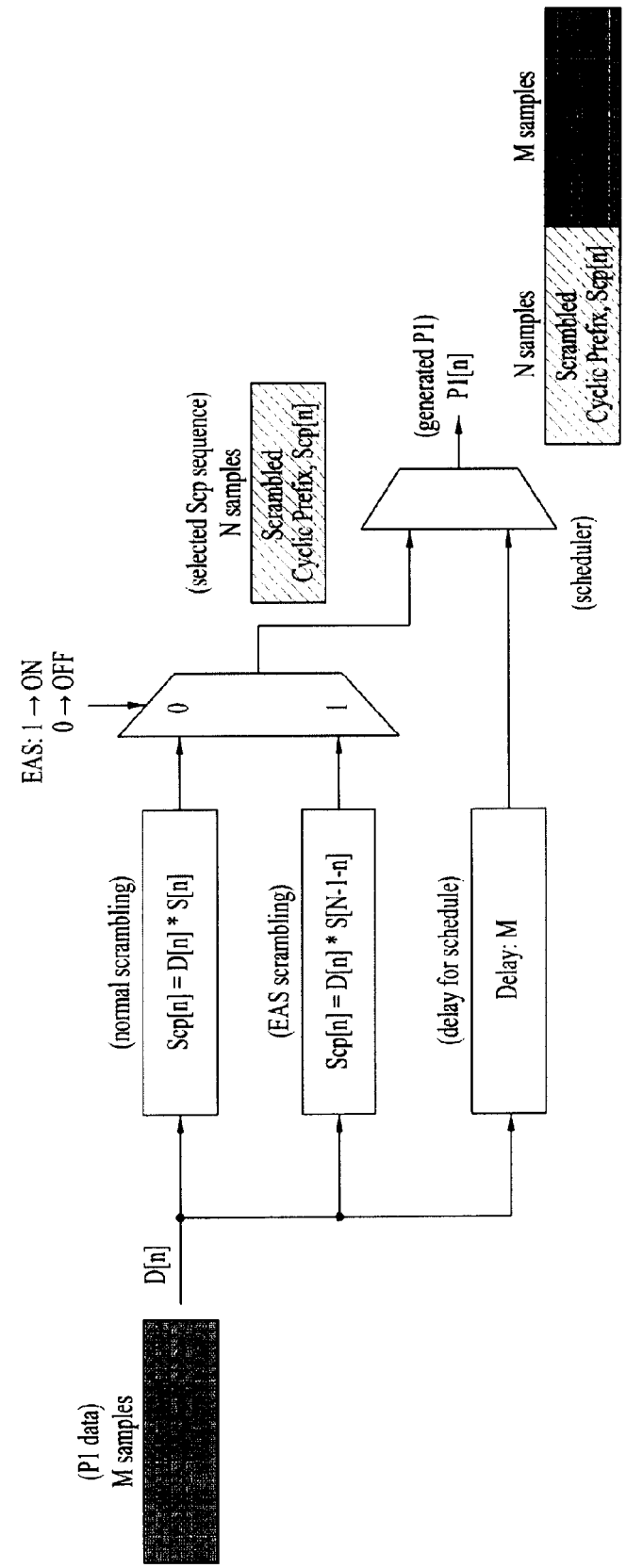
FIG. 26 is a view illustrating a method for generating P1 depending on EAS according to an embodiment of the present invention.

FIG. 26 is a view illustrating a method for generating P1 depending on EAS according to an embodiment of the present invention.

An original data signal D[n] for generating P1 may be initially input. This may be expressed as an OFDM symbol having M samples.

D[n] may be input to an M delay block for scheduling of a scrambled cyclic prefix signal and the original data signal. The M delay block may delay D[n] by M samples.

In addition, D[n] may be input to the normal scrambling block and an EAS scrambling block to generate a scrambled cyclic prefix. The normal scrambling block may perform the above-described scrambling procedure for generating P1norm. The EAS scrambling block may perform the above-described scrambling procedure for generating EAS P1. In an EAS circumstance, i.e., if EAS data is present in a corresponding frame or if one of the frames transmitted/received after the corresponding frame is a frame including EAS data, the signal passed through the EAS scrambling block may be selected. In a normal circumstance, the signal passed through the normal scrambling block may be selected. This selection procedure may be performed by a selector for a scrambled cyclic prefix. According to an embodiment, a block for performing the selection operation may be located prior to the scrambling blocks. In this case, any one of the two scrambling blocks may operate.

The selected cyclic prefix may be combined with the delayed D[n]. This operation may be performed by a scheduler. As such, P1 may be generated. The generated P1 may have a form in which a cyclic prefix comes first and an OFDM symbol follows the cyclic prefix as described above. Alternatively, if the scheduler is modified, an OFDM symbol may come first and then a cyclic prefix may be output.

The above-described method for generating P1 is merely an embodiment and may be implemented in another form having the same concept.

Figure 27:
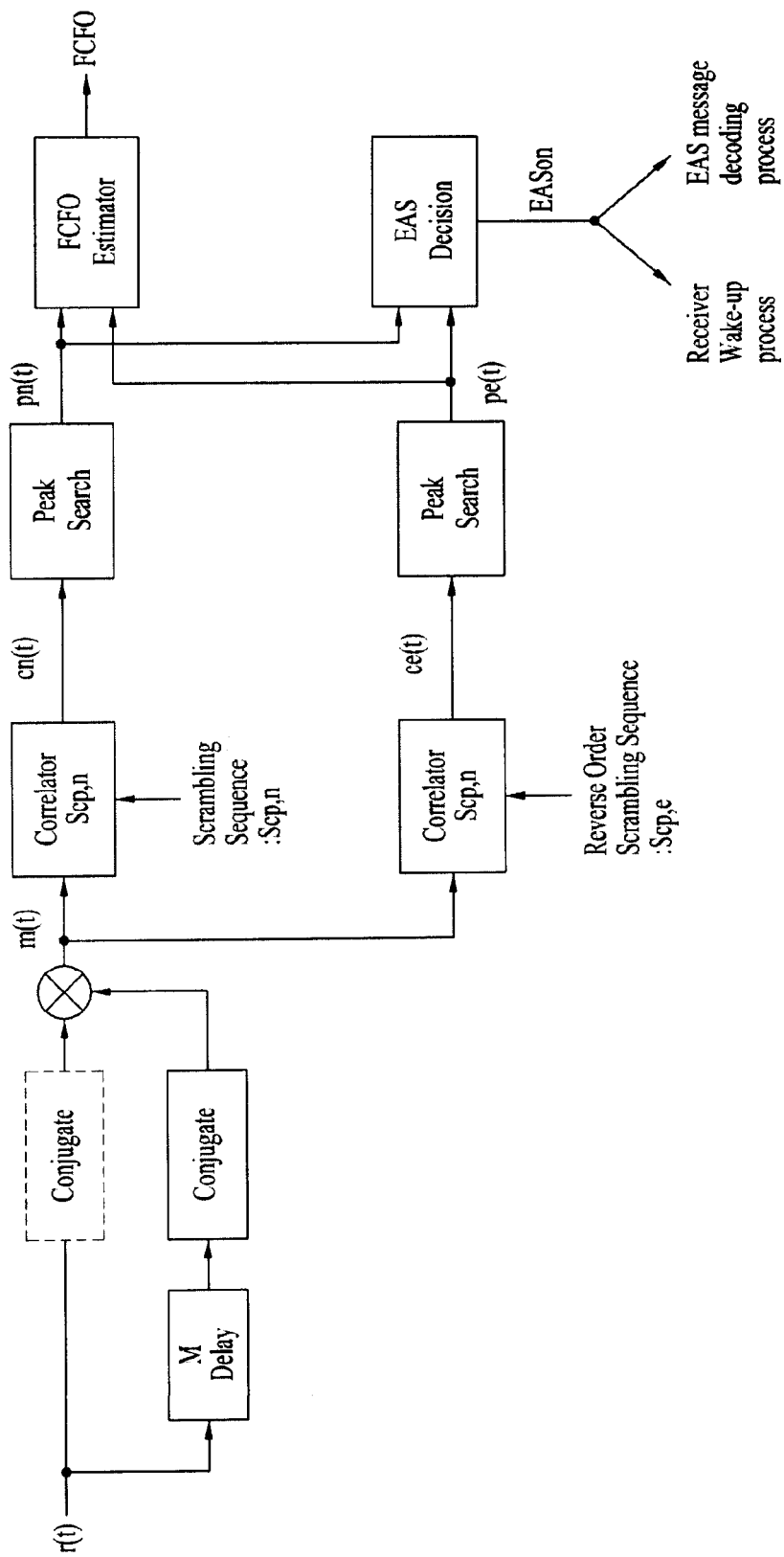
FIG. 27 is a view illustrating a detector according to another embodiment of the present invention.

FIG. 27 is a view illustrating a detector according to another embodiment of the present invention.

The detector according to the current embodiment may be modified from the above-described detector to further detect EAS P1. The detector according to the current embodiment may further include one more correlator block, one more peak search block and an EAS decision block compared to the above-described detector.

The M delay block may delay a received signal by M as described above to remove influence due to the sign of an original data signal. In addition, the conjugate block may perform conjugation and multiply the conjugated signal by a non-delayed signal as described above. The signal to be multiplied may be an original data signal or a signal obtained by multiplying the original data signal by a scrambling sequence (scrambled cyclic prefix). As described above, if the scrambling sequence has a real value, a solid-line conjugate block may be used. If the scrambling sequence has an imaginary value, a dashed-line conjugate block may be used.

A signal m(t) obtained by multiplying the two signals may have a sign switched due to the scrambling sequence. This signal may be input to the two correlator blocks. A correlator block Scp.n may be a block for generating a peak if the input P1 is P1norm. A correlator block Scp.e may be a block for generating a peak if the input P1 is EAS P1. The correlator block Scp.e may use a reverse order scrambling sequence. Outputs of the two correlator blocks are cn(t) and ce(t) and may be input to the peak search blocks, respectively. In this manner, the presence of EAS may be detected by detecting a scrambling sequence.

Each peak search block may output the presence of a peak and a value thereof. The FCFO estimator block may estimate an FCFO value using the received peak value and send this FCFO value to an FCFO compensation block.

The EAS decision block may determine the presence of EAS using pn(t) and pe(t) output from the peak search blocks. The determination of the presence of EAS may refer to determining whether the received P1 is EAS P1. That is, the determination of the presence of EAS may refer to determining whether P1 is generated using an EAS sequence. For example, a case in which EAS is present may be a case in which EAS data is present in a corresponding frame or a case in which EAS data is present in at least one of frames after the corresponding frame. If the signal pe(t) has a peak and the signal pn(t) has no peak, this indicates that EAS is present. Otherwise, if the signal pn(t) has a peak and the signal pe(t) has no peak, this indicates P1norm having no EAS. If both the signal pn(t) and the signal pe(t) have peaks, this is regarded as false detection. Otherwise, if none of the two signals has a peak, this is regarded that P1 is not present.

If EAS is detected by the EAS decision block, a signal EASon may be activated. When the signal EASon is activated, the following two modes may be executed. First, if a receiver is in any mode for saving power, e.g., sleep mode or standby mode, a signal may be transmitted to activate (i.e., wake up) the receiver. When the receiver wakes up, the receiver is in a state capable of receiving signals and may perform a process for decoding EAS data (message). Second, if the receiver is already awake, the receiver may directly perform the process for decoding EAS data.

Figure 28:
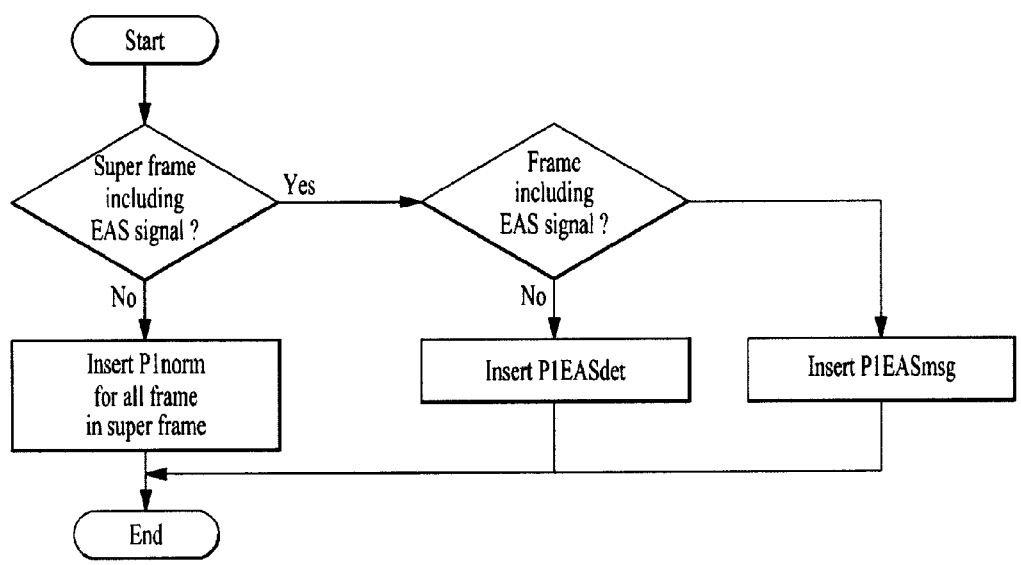
FIG. 28 is a view illustrating a method for inserting P1 into a frame according to an embodiment of the present invention.

FIG. 28 is a view illustrating a method for inserting P1 into a frame according to an embodiment of the present invention.

Initially, it is determined whether a frame including EAS data is present in a corresponding superframe. As described above, according to an embodiment, a unit for determining whether a frame including EAS data is present may be a non-superframe or an appropriate number of frames.

If EAS is not present, P1norm may be inserted into all frames of the superframe. Alternatively, according to another embodiment, P1norm may be inserted into the above-described appropriate number of frames.

If EAS is present, it is determined whether EAS data is present in a corresponding frame. P1EASdet may be inserted if EAS data is not present, and P1EASmsg may be inserted if EAS data is present.

Figure 29:
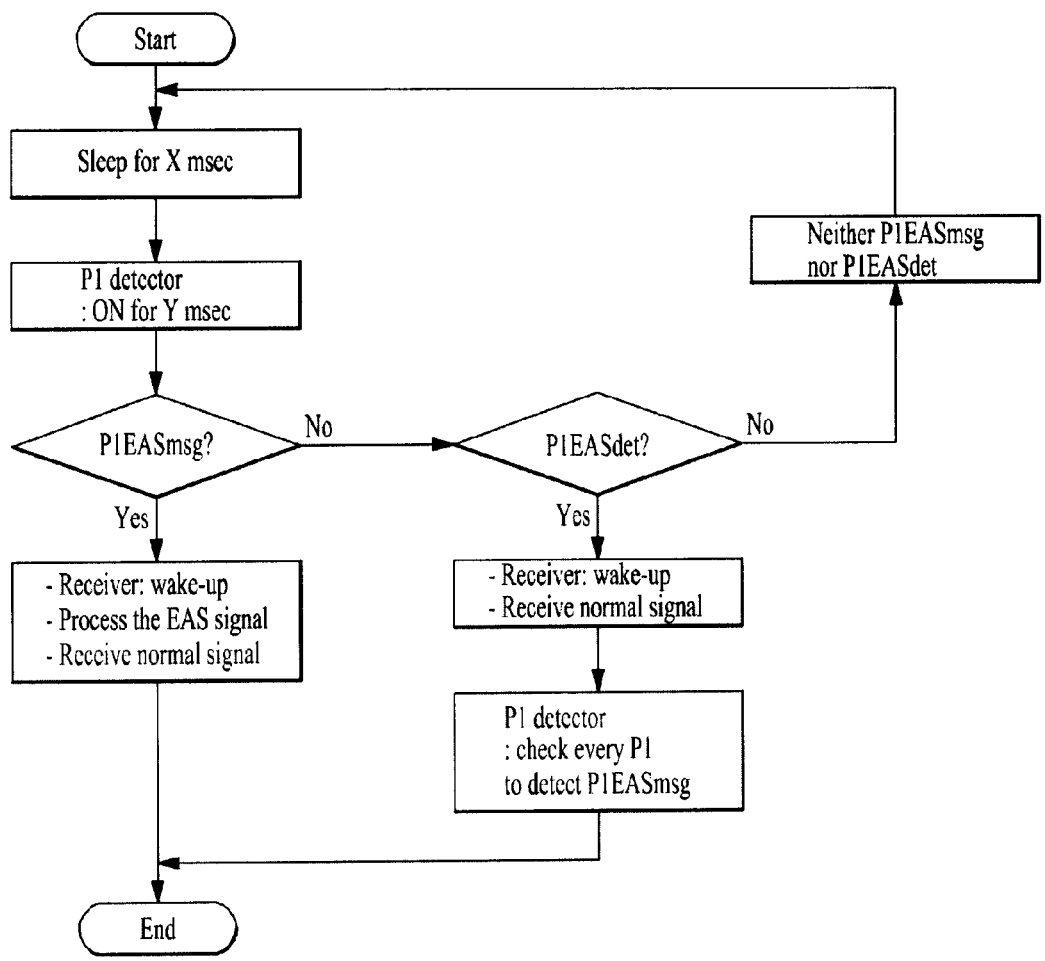
FIG. 29 is a view illustrating a wake-up process according to an embodiment of the present invention.

FIG. 29 is a view illustrating a wake-up process according to an embodiment of the present invention.

The wake-up process may differ depending on the presence of EAS. This process may be performed only when a wake-up function of a receiver depending on an EAS signal is activated.

The receiver may stand by (sleep) for a given time, e.g., X msec. After that, a P1 detector may be turned on to detect P1 for Y msec. The detection result may be delivered to a subsequent determination block.

If the detected P1 is P1EASmsg, the receiver wakes up and may be switched from a standby mode to a normal Rx mode. In the case of P1EASmsg, after the receiver wakes up, the receiver may process EAS data of a corresponding frame. The receiver may process a normal broadcast signal after processing the EAS data.

If the detected P1 is not P1EASmsg, it may be determined whether the detected P1 is P1EASdet. If the detected P1 is P1EASdet, the receiver may wake up. However, since the corresponding frame has no EAS data, the receiver may process a normal broadcast signal in the awake state. In the awake state, the P1 detector may check whether every received P1 is P1EASmsg. This is contrasted with a case in which the receiver stands by for X msec. in the standby mode and the detector is turned on only for Y msec.

If the detected P1 is not P1EASdet, since the received P1 is neither P1EASmsg nor P1EASdet, this is regarded that EAS is not present and the receiver may enter the standby (sleep) mode again for X msec. After that, P1 detection may be performed again for Y msec. When an EAS wake-up function is activated in the standby mode, the above procedure may always be performed. The EAS wake-up function may refer to a function for waking up the receiver if an EAS signal is received in the standby mode.

Figure 30:
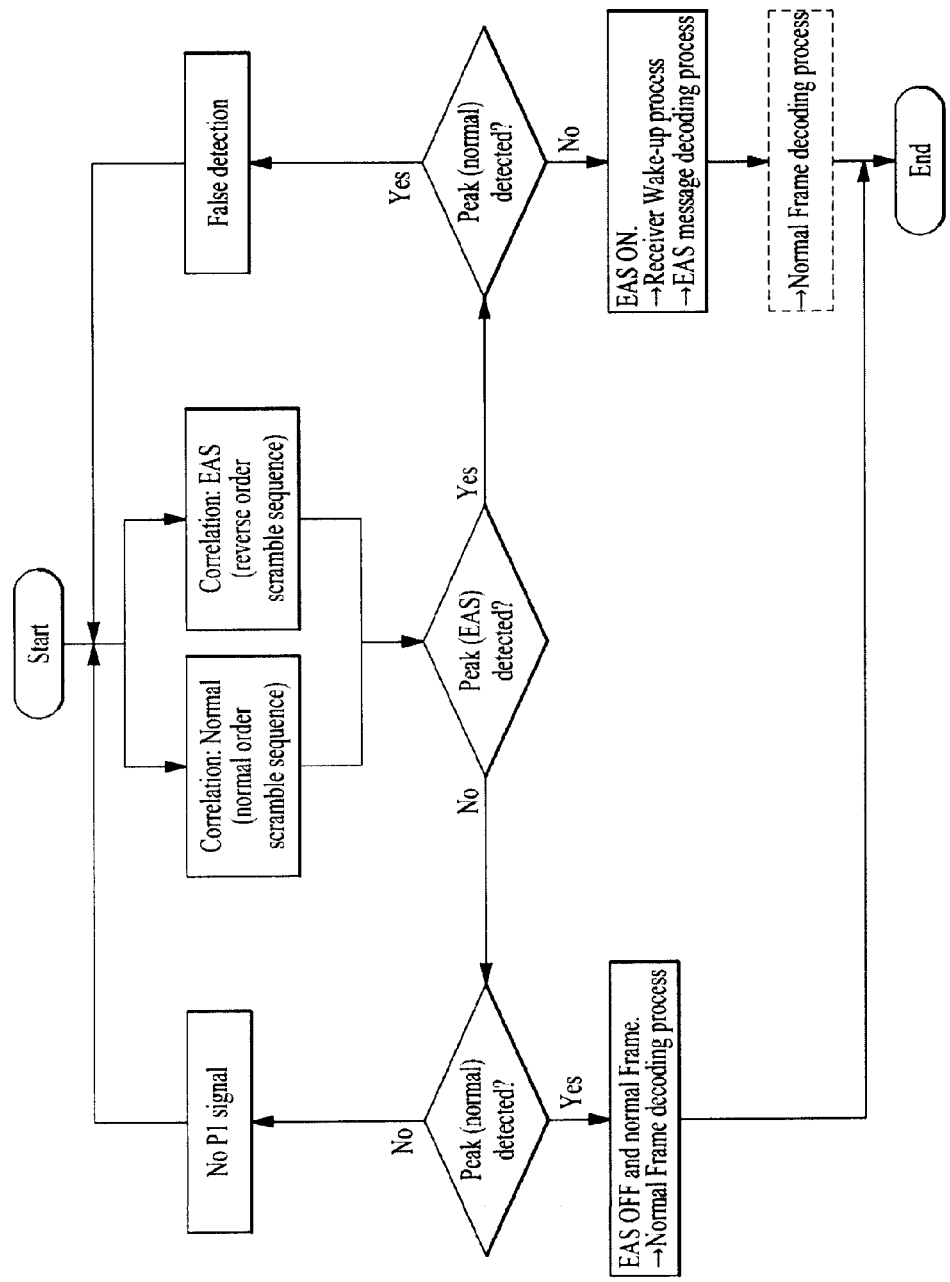
FIG. 30 is a view illustrating a procedure for determining the presence of EAS according to an embodiment of the present invention.

FIG. 30 is a view illustrating a procedure for determining the presence of EAS according to an embodiment of the present invention.

Correlation may be performed simultaneously on P1norm and EAS P1. P1norm may have been generated using a normal sequence and EAS P1 may have been generated using an EAS sequence. EAS P1 may have been generated through reverse order scrambling as described above.

The two correlation signals may be input and thus it may be determined whether an EAS peak is detected. If an EAS peak is present, it may be determined whether a normal peak is present. If a normal peak is present, this corresponds to false detection and thus correlation may be performed again. If an EAS peak is present but a normal peak is not present, this may indicate that EAS is present. Accordingly, a receiver may perform the above-described operation. That is, if the receiver is in a standby mode, the receiver may wake up and then perform EAS decoding if EAS P1 is P1EASmsg. Whether EAS P1 is P1EASdet or P1EASmsg may be determined based on flag information of a preamble as described above. The receiver may process a normal broadcast signal after performing EAS decoding. In addition, if the receiver is already awake, the receiver may directly perform EAS decoding and then process a normal broadcast signal. The normal broadcast signal may have been transmitted in a normal frame.

When it is determined whether an EAS peak is detected, if an EAS peak is not present, it may be detected whether a normal peak is present. If a normal peak is not present, this indicates that P1 is not present and correlation may be performed again. If a normal peak is present, this may indicate a normal frame having no EAS and thus the receiver may decode a normal broadcast signal of the normal frame.

Figure 31:
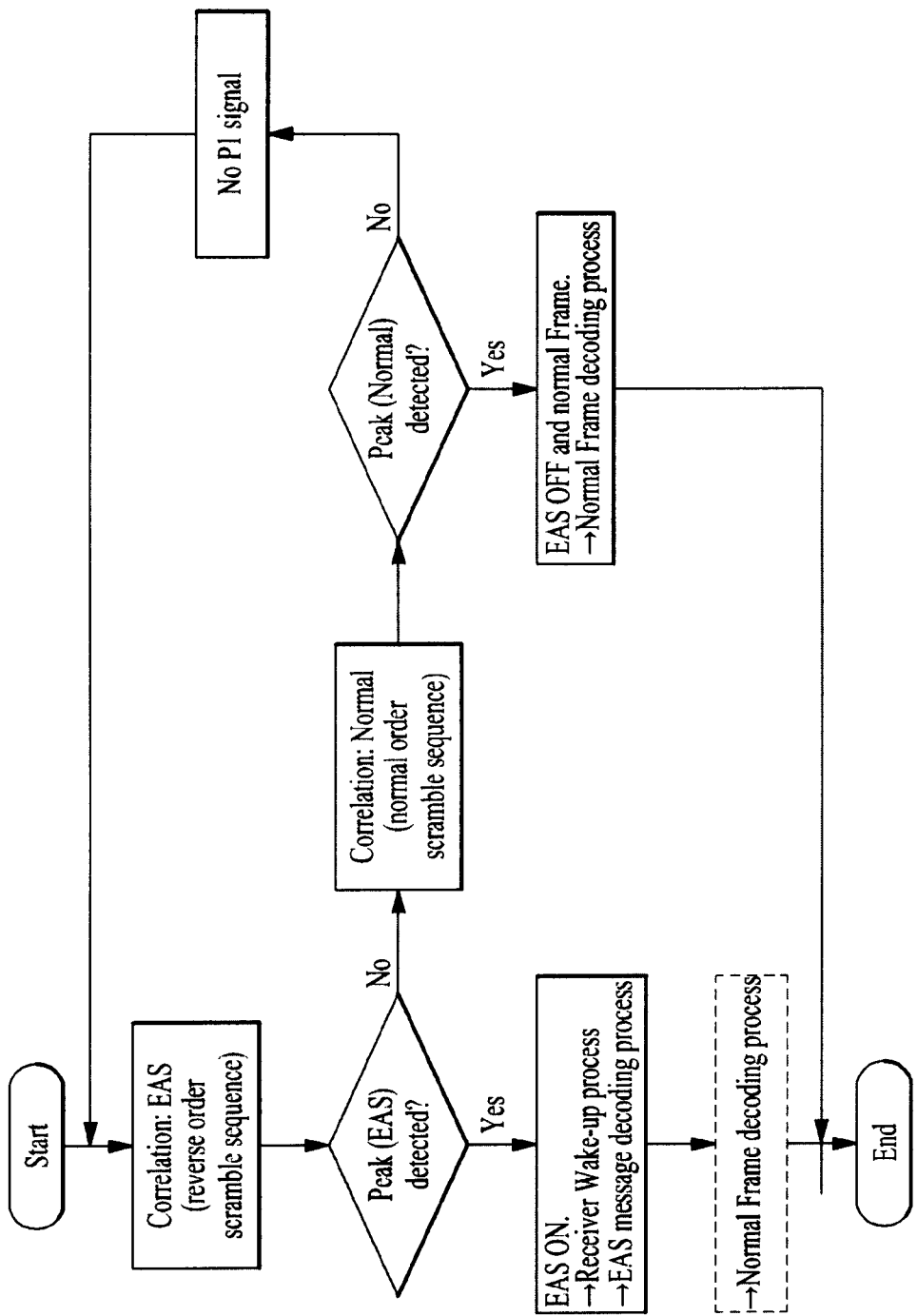
FIG. 31 is a view illustrating a procedure for determining the presence of EAS according to another embodiment of the present invention.

FIG. 31 is a view illustrating a procedure for determining the presence of EAS according to another embodiment of the present invention.

Initially, correlation may be performed on EAS P1. EAS P1 may have been generated using an EAS sequence. EAS P1 may have been generated through reverse order scrambling as described above. Since correlation is performed on EAS P1, a reverse order scrambling sequence (i.e., EAS sequence) may be used.

An EAS peak may be detected using the correlation result on EAS P1. If an EAS peak is present, this may indicate that EAS is present. Accordingly, a receiver may perform the above-described operation. That is, if the receiver is in a standby mode, the receiver may wake up and then perform EAS decoding if EAS P1 is P1EASmsg. The receiver may process a normal broadcast signal after performing EAS decoding. In addition, if the receiver is already awake, the receiver may directly perform EAS decoding and then process a normal broadcast signal. The normal broadcast signal may have been transmitted in a normal frame.

When it is determined whether an EAS peak is detected, if an EAS peak is not present, correlation may be performed on P1norm. P1norm may have been generated using a normal sequence. Accordingly, correlation may be performed using the normal sequence. By performing correlation, it may be detected whether a normal peak is present. If a normal peak is not present, this indicates that P1 is not present and correlation may be performed again. If a normal peak is present, this may indicate a normal frame having no EAS and thus the receiver may decode a normal broadcast signal of the normal frame.

As described above, it may be determined whether EAS is present, by detecting a sequence of P1 or a preamble. As such, it may be determined whether to wake up a receiver.

Figure 32:
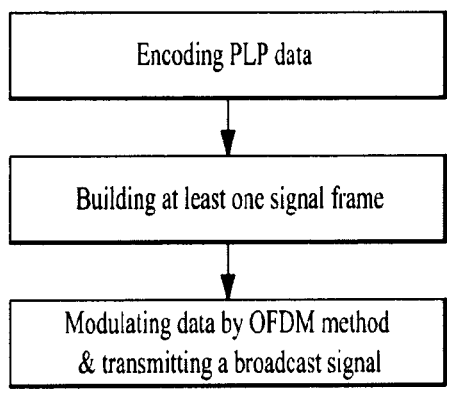
FIG. 32 illustrates a method of alerting an emergency via broadcast signal transmission according to an embodiment of the present invention.

FIG. 32 illustrates a method of alerting an emergency via broadcast signal transmission according to an embodiment of the present invention.

The method includes encoding PLP data, building at least one signal frame, and/or modulating data by OFDM method & transmitting a broadcast signal.

In step of encoding PLP data, the above described coding & modulation module may encode PLP data in each data path. The PLP also can be referred to as DP, Data Pipe. This step can includes LDPC encoding, bit interleaving and so on.

In step of building at least one signal frame, the above-described frame structure module can build signal frames by mapping the encoded PLP data.

In step of modulating data by OFDM method & transmitting broadcast signals, the above-described waveform generation module can modulate data in OFDM method, and transmit the broadcast signals.

In this embodiment, the signal frame can include a preamble having a preamble symbol and a guard interval. The guard interval can be generated by using a sequence and the preamble symbol. The sequence can be either a normal sequence or an EAS sequence, as described above.

In other embodiment according to the present invention, the sequence is either a normal sequence or an EAS (Emergency Alert System) sequence. As described above, the EAS sequence can indicate that emergency occurs. The above described EAS data(EAS information) can include actual information about the emergency. The EAS sequence can provide signaling about the emergency.

In another embodiment according to the present invention, a preamble can notify that signal frame transmitted with the corresponding signal frame includes the EAS data. The preamble can have the guard interval generated by using the EAS sequence. The corresponding signal frame refers to the signal frame that includes the preamble. In this embodiment, the preamble can refer to above described P1EASdet. It may notify that signal frame transmitted after the corresponding signal frame includes the EAS data, according to another embodiment of P1EASdet.

In another embodiment according to the present invention, a preamble can indicate that the corresponding signal frame includes the EAS data. The preamble can have the guard interval generated by using the EAS sequence. The corresponding signal frame refers to the signal frame that includes the preamble. In this embodiment, the preamble can refer to above described P1EASmsg.

In another embodiment according to the present invention, the step of encoding PLP data further includes LDPC encoding, bit interleaving, constellation mapping, MIMO encoding and/or time interleaving. LDPC encoding may correspond to LDPC encoding by LDPC encoder. Bit interleaving may correspond to bit interleaving by bit interleaver. Constellation mapping may correspond to the constellation mapping conducted by constellation mapper. MIMO encoding can refer to MIMO encoding performed by above described MIMO encoder. Time interleaving can correspond to time interleaving by time interleaver.

The above-described steps can be omitted or replaced by steps executing similar or identical functions according to design.

Figure 33:
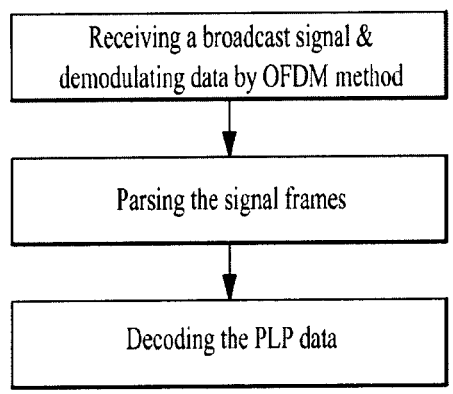
FIG. 33 illustrates a method of alerting an emergency via broadcast signal reception according to an embodiment of the present invention.

FIG. 33 illustrates a method of alerting an emergency via broadcast signal reception according to an embodiment of the present invention.

The method may include receiving broadcast signals & demodulating data by OFDM method, parsing the at least one signal frame, and/or decoding the PLP data.

In step of receiving broadcast signals & demodulating data by OFDM method, the above-described synchronization & demodulation module receives broadcast signals, and demodulates data by OFDM method.

In step of parsing the at least one signal frame, the above-described frame parsing module parses the signal frame by demapping PLP data. The PLP also can be referred to as DP, Data Pipe.

In step of decoding the PLP data, the above-described demapping & decoding module decodes the PLP data. Step of decoding the PLP data can include time deinterleaving, MIMO (Multi Input Multi Output) decoding, and so on.

In this embodiment, the signal frame can include a preamble having a preamble symbol and a guard interval. The guard interval can be generated by using a sequence and the preamble symbol. The sequence can be either a normal sequence or an EAS sequence, as described above.

In other embodiment according to the present invention, the sequence is either a normal sequence or an EAS (Emergency Alert System) sequence. As described above, the EAS sequence can indicate that emergency occurs. The above described EAS data(EAS information) can include actual information about the emergency. The EAS sequence can provide signaling about the emergency.

In another embodiment according to the present invention, the method further includes detecting the EAS sequence, checking whether the corresponding signal frame includes the EAS data, and/or checking preambles in signal frames received after the checked signal frame.

In step of detecting the EAS sequence, certain detector can detect the EAS sequence in the preamble. The detector can be above-described detector that detecting sequences in the preamble. The detector can be located in the synchronization & demodulation module. The detector can correspond to one of the blocks in the synchronization & demodulation module. By detecting EAS sequence, the receiver can wake-up, as described above.

In step of checking whether the corresponding signal frame includes the EAS data, checking module can check if the signal frame includes the EAS data by using the preamble. It can be checked by flag information in the preamble. The EAS data can be referred to as EAC, Emergency Alert Channel. Or the EAS data can be delivered via the EAC. The checking module may located in the synchronization & demodulation module. The detector can correspond to one of the blocks in the synchronization & demodulation module. By checking, whether the P1 is either P1EASdet or P1EASmsg can be distinguished, as described above. The checking module can be called first checking module.

In step of checking preambles in signal frames received after the checked signal frame, other checking module can conduct checking to find a signal frame including the EAS data. This step corresponds to the case that P1 is P1EASdet. If P1 is P1EASdet, it means that corresponding signal frame doesn't have the EAS data. So the receiver may keep searching for the EAS data by checking the P1 of the other signal frame. In this case, the receiver may be in state of wake-up. The checking module may located in the synchronization & demodulation module. The detector can correspond to one of the blocks in the synchronization & demodulation module. By checking, whether the P1 is either P1EASdet or P1EASmsg can be distinguished, as described above. The checking module can be called second checking module.

In another embodiment according to the present invention, the method further includes detecting the EAS sequence, checking whether the corresponding signal frame includes the EAS data, and/or decoding the EAS data.

The steps of detecting the EAS sequence and checking whether the corresponding signal frame includes the EAS data, may be similar with the steps in the above-described embodiment.

In step of the decoding the EAS data, a EAS decoding module can decode the EAS data in the corresponding signal frame. This step corresponds to the case that P1 is P1EASmsg. If P1 is P1EASmsg, the EAS data can be decoded, since the signal frame has the EAS data. In this case, the receiver may be in state of wake-up. The EAS decoding module may located in the decoding & demapping module, which is described above. The EAS decoding module can correspond to one of the blocks in the decoding & demapping module. According to other embodiment of the EAS decoding module, the EAS decoding module may located in the synchronization & demodulation module. The EAS decoding module can correspond to one of the blocks in the synchronization & demodulation module. By decoding the EAS data, the data related to the emergency can be obtained.

In another embodiment according to the present invention, the decoding the PLP data further includes time deinterleaving, MIMO decoding, constellation demapping, bit deinterleaving and/or LDPC decoding. In step of time deinterleaving, the above-described time deinterleaver can conduct time deinterleaving PLP data. In step of MIMO decoding, the above-described MIMO decoder can conduct MIMO decoding PLP data. MIMO decoding can be conducted by using MIMO matrix including MIMO coefficient. MIMO coefficient can be used for adjusting power imbalance. In step of demapping from constellations, the above-described constellation demapper can conduct demapping. The demapping can be conducted on PLP data. In step of bit deinterleaving, the above-described bit deinterleaver can conduct bit deinterleaving. In step of LDPC decoding. the above-described LDPC decoder (or FEC decoder) can decode PLP data according to LDPC code.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention has industrial applicability in broadcasting and communication field.

What is claimed is:

1. A method of alerting an emergency via broadcast signal transmission, the method including:
   encoding Physical Layer Pipe (PLP) data;
   building at least one signal frame by mapping the encoded PLP data;
   modulating data in the built signal frame by an Orthogonal Frequency Division Multiplexing (OFDM) method;
   inserting a preamble at a beginning of each signal frame in a time domain; and
   transmitting a broadcast signal having the preamble and the modulated data,
   wherein the preamble is generated from a sequence and the sequence provides information for an emergency, and
   wherein the information for the emergency wakes up a receiver from a standby mode.

2. The method of claim 1, wherein the preamble includes a guard interval.

3. The method of claim 1, wherein the encoding PLP data further includes
   Low Density Parity Check (LDPC) encoding the PLP data,
   bit interleaving the LDPC encoded PLP data,
   mapping the bit interleaved PLP data onto constellations,
   Multi Input Multi Output (MIMO) encoding the mapped PLP data, and
   time interleaving the MIMO encoded PLP data.

4. A method of alerting an emergency via broadcast signal reception, the method including:
   receiving a broadcast signal having a preamble and at least one signal frame;
   detecting the preamble at a beginning of each signal frame in a time domain;
   demodulating data in the at least one signal frame by an Orthogonal Frequency Division Multiplexing (OFDM) method;
   parsing the received signal frames by demapping Physical Layer Pipe (PLP) data; and
   decoding the PLP data,
   wherein the preamble is generated from a sequence and the sequence provides information for an emergency, and
   wherein the information for the emergency wakes up a receiver from a standby mode.

5. The method of claim 4, wherein the preamble includes a guard interval.

6. The method of claim 4, wherein the decoding the PLP data further includes
   time deinterleaving the PLP data,
   Multi Input Multi Output (MIMO) decoding the time deinterleaved PLP data,
   demapping the MIMO decoded PLP data from constellations,
   bit deinterleaving the demapped PLP data, and Low Density Parity Check (LDPC) decoding the bit deinterleaved PLP data.

7. An apparatus for alerting an emergency via broadcast signal transmission, the apparatus including:
a processor that
encodes Physical Layer Pipe (PLP) data;
builds at least one signal frame by mapping the encoded PLP data; and
modulates data in the built signal frame by an Orthogonal Frequency Division Multiplexing (OFDM) method;
inserts a preamble at a beginning of each signal frame in a time domain; and
transmits a broadcast signal having the preamble and the modulated data,
wherein the preamble is generated from a sequence and the sequence provides information for an emergency, and
wherein the information for the emergency wakes up a receiver from a standby mode.

8. The apparatus of claim 7, wherein the preamble includes a guard interval.

9. The apparatus of claim 7, wherein the encoding Physical Layer Pipe (PLP) data by the processor further includes:
Low Density Parity Check (LDPC) encoding the PLP data,
bit interleaving the LDPC encoded PLP data,
mapping the bit interleaved PLP data onto constellations,
Multi Input Multi Output (MIMO) encoding the mapped PLP data, and
time interleaving the MIMO encoded PLP data.

10. An apparatus for alerting an emergency via broadcast signal reception, the apparatus including:
a processor that
receives a broadcast signal having a preamble and at least one signal frame;
detects the preamble at a beginning of each signal frame in a time domain;
demodulates data in the at least one signal frame by an Orthogonal Frequency Division Multiplexing (OFDM) method;
parses the received signal frames by demapping Physical Layer Pipe (PLP) data; and
decodes the PLP data,
wherein the preamble is generated from a sequence and the sequence provides information for an emergency, and
wherein the information for the emergency wakes up a receiver from a standby mode.

11. The apparatus of claim 10, wherein the preamble includes a guard interval.

12. The apparatus of claim 10, wherein the decoding the PLP data by the processor further includes:
time deinterleaving the PLP data,
Multi Input Multi Output (MIMO) decoding the time deinterleaved PLP data,
demaping the MIMO decoded PLP data from constellations,
bit deinterleaving the demapped PLP data, and
LDPC (Low Density Parity Check) decoding the bit deinterleaved PLP data.

* * * * *